US009767610B2

(12) United States Patent
Takeuchi

(10) Patent No.: US 9,767,610 B2
(45) Date of Patent: Sep. 19, 2017

(54) IMAGE PROCESSING DEVICE, IMAGE PROCESSING METHOD, AND TERMINAL DEVICE FOR DISTORTING AN ACQUIRED IMAGE

(71) Applicant: SONY CORPORATION, Tokyo (JP)

(72) Inventor: Yuichiro Takeuchi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/441,302

(22) PCT Filed: Oct. 25, 2013

(86) PCT No.: PCT/JP2013/006339
§ 371 (c)(1),
(2) Date: May 7, 2015

(87) PCT Pub. No.: WO2014/083759
PCT Pub. Date: Jun. 5, 2014

(65) Prior Publication Data
US 2015/0302645 A1    Oct. 22, 2015

(30) Foreign Application Priority Data

Nov. 27, 2012   (JP) ................................. 2012-258399

(51) Int. Cl.
| G06K 9/00 | (2006.01) |
| G02B 27/01 | (2006.01) |
| G06T 5/00 | (2006.01) |
| G06T 19/00 | (2011.01) |
| G01C 21/36 | (2006.01) |

(52) U.S. Cl.
CPC ........ *G06T 19/006* (2013.01); *G01C 21/3602* (2013.01); *G01C 21/365* (2013.01); *G01C 21/3638* (2013.01); *G01C 21/3647* (2013.01); *G02B 27/017* (2013.01); *G06K 9/00664* (2013.01); *G06T 5/002* (2013.01); *G02B 2027/0178* (2013.01)

(58) Field of Classification Search
CPC ................ G01C 21/20; G01C 21/3626; G01C 21/3638; A63F 13/10; H04N 13/026; B60R 16/0373; G06Q 50/00
See application file for complete search history.

(56) References Cited

U.S. PATENT DOCUMENTS 5,771,073 A * 6/1998 Lim ....................... H04N 7/007
                                                                        348/390.1
6,317,687 B1 * 11/2001 Morimoto ........... B60R 16/0373
                                                                        701/441
(Continued)

FOREIGN PATENT DOCUMENTS

JP    2010-224347    10/2010

*Primary Examiner* — Devona Faulk
*Assistant Examiner* — Kevin Wu
(74) *Attorney, Agent, or Firm* — Paratus Law Group, PLLC

(57) ABSTRACT

An information processing system that acquires image data; distorts the acquired image data according to a predetermined distortion criterion; acquires an object image corresponding to an object that is at least partially obstructed in the acquired image; combines the object image with the distorted image data; and outputs the distorted image data combined with the object image.

17 Claims, 32 Drawing Sheets

(56) References Cited

U.S. PATENT DOCUMENTS

| | | | |
|---|---|---|---|
| 2004/0128070 A1* | 7/2004 | Schmidt | G01C 21/3638 |
| | | | 701/436 |
| 2006/0241792 A1* | 10/2006 | Pretlove | G06Q 50/00 |
| | | | 700/83 |
| 2010/0023253 A1* | 1/2010 | Jung | G01C 21/3626 |
| | | | 701/533 |
| 2011/0035131 A1* | 2/2011 | Yasui | B60W 30/146 |
| | | | 701/93 |
| 2011/0310097 A1* | 12/2011 | Ushio | H04N 13/026 |
| | | | 345/419 |
| 2011/0313653 A1* | 12/2011 | Lindner | G01C 21/3632 |
| | | | 701/523 |
| 2012/0008048 A1* | 1/2012 | Sekine | G06T 19/006 |
| | | | 348/566 |
| 2012/0135744 A1* | 5/2012 | Curtis | H04W 4/025 |
| | | | 455/456.1 |
| 2012/0176525 A1* | 7/2012 | Garin | G01C 21/20 |
| | | | 348/333.02 |
| 2013/0227398 A1* | 8/2013 | Bolstad | G06F 17/212 |
| | | | 715/236 |

* cited by examiner

[Fig. 1A]
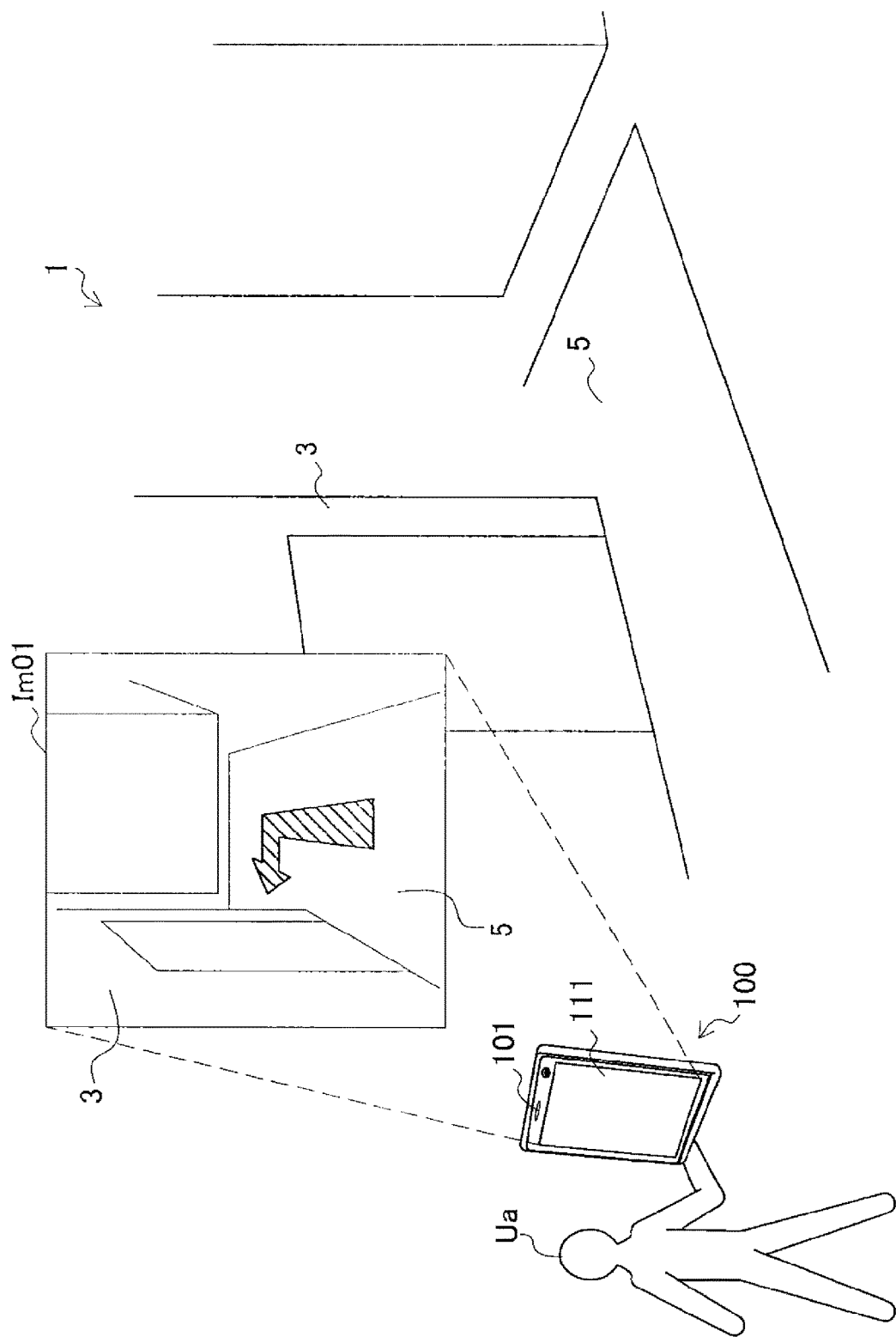

[Fig. 1B]
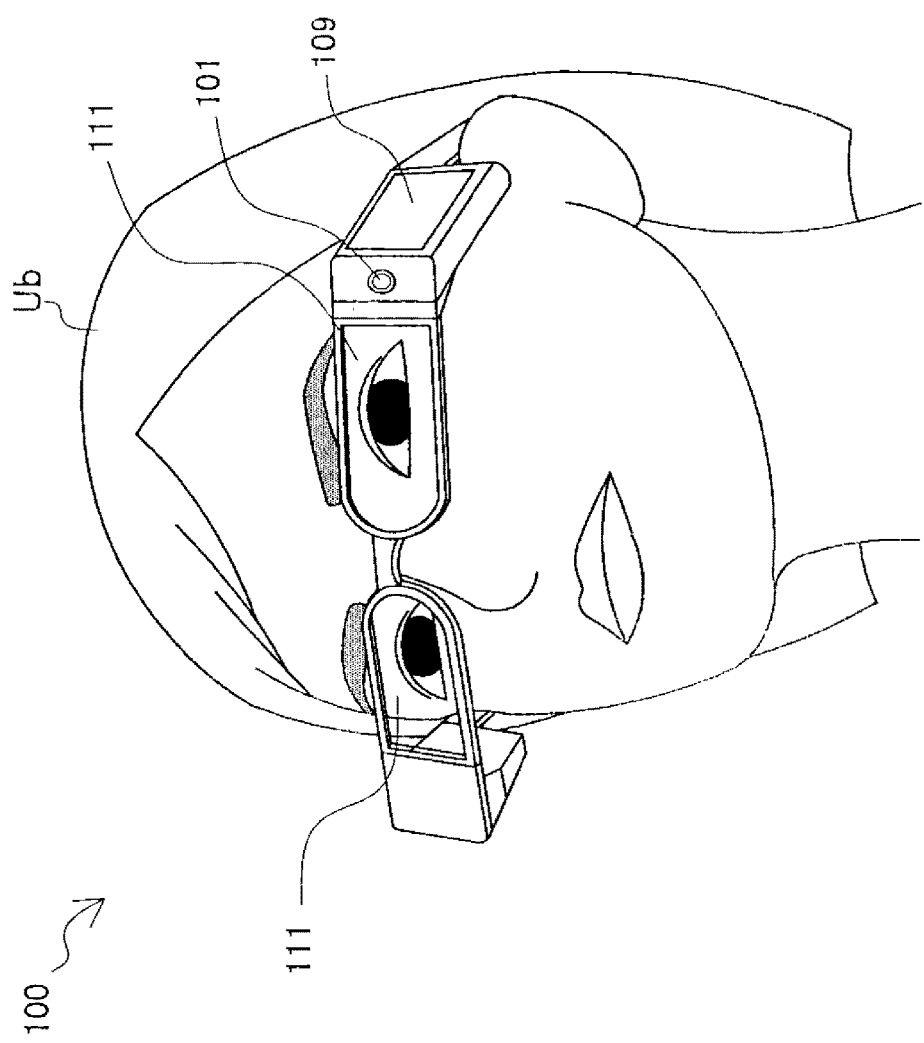

[Fig. 2]
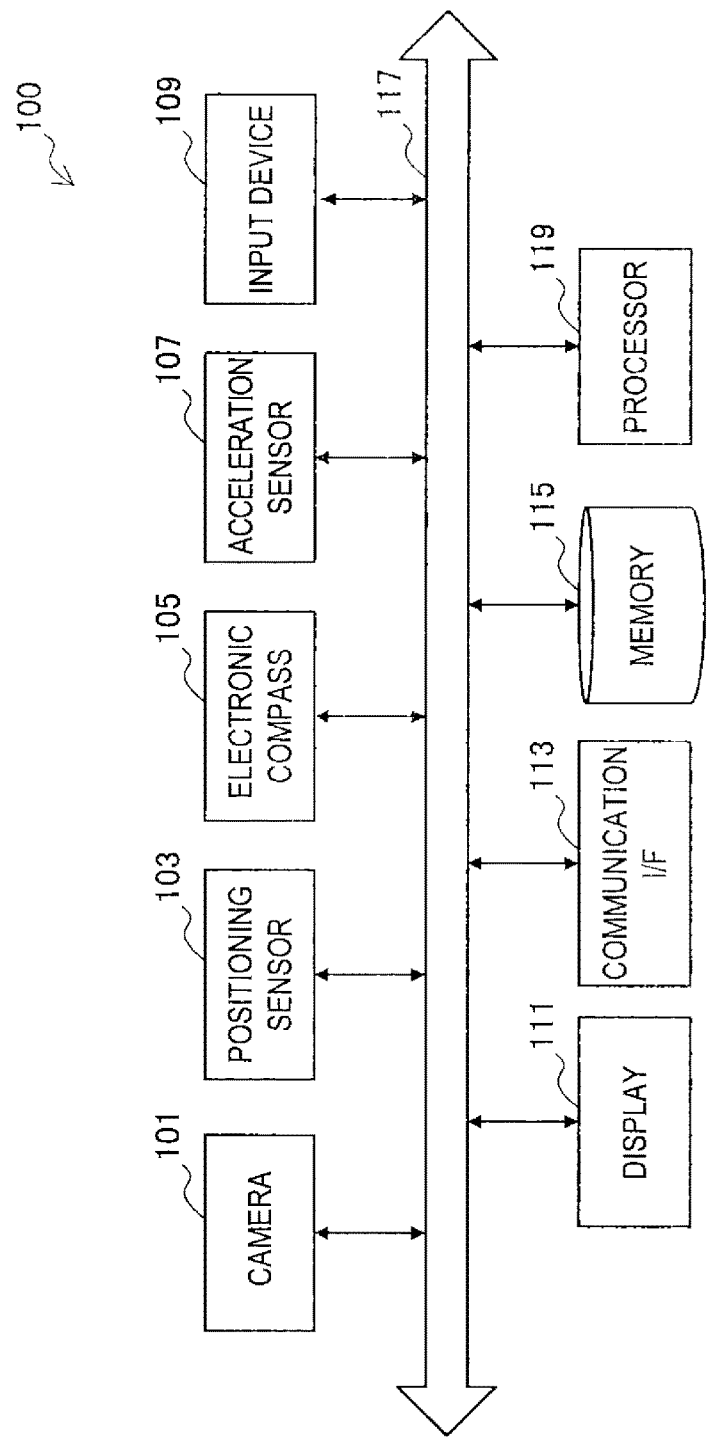

[Fig. 3]
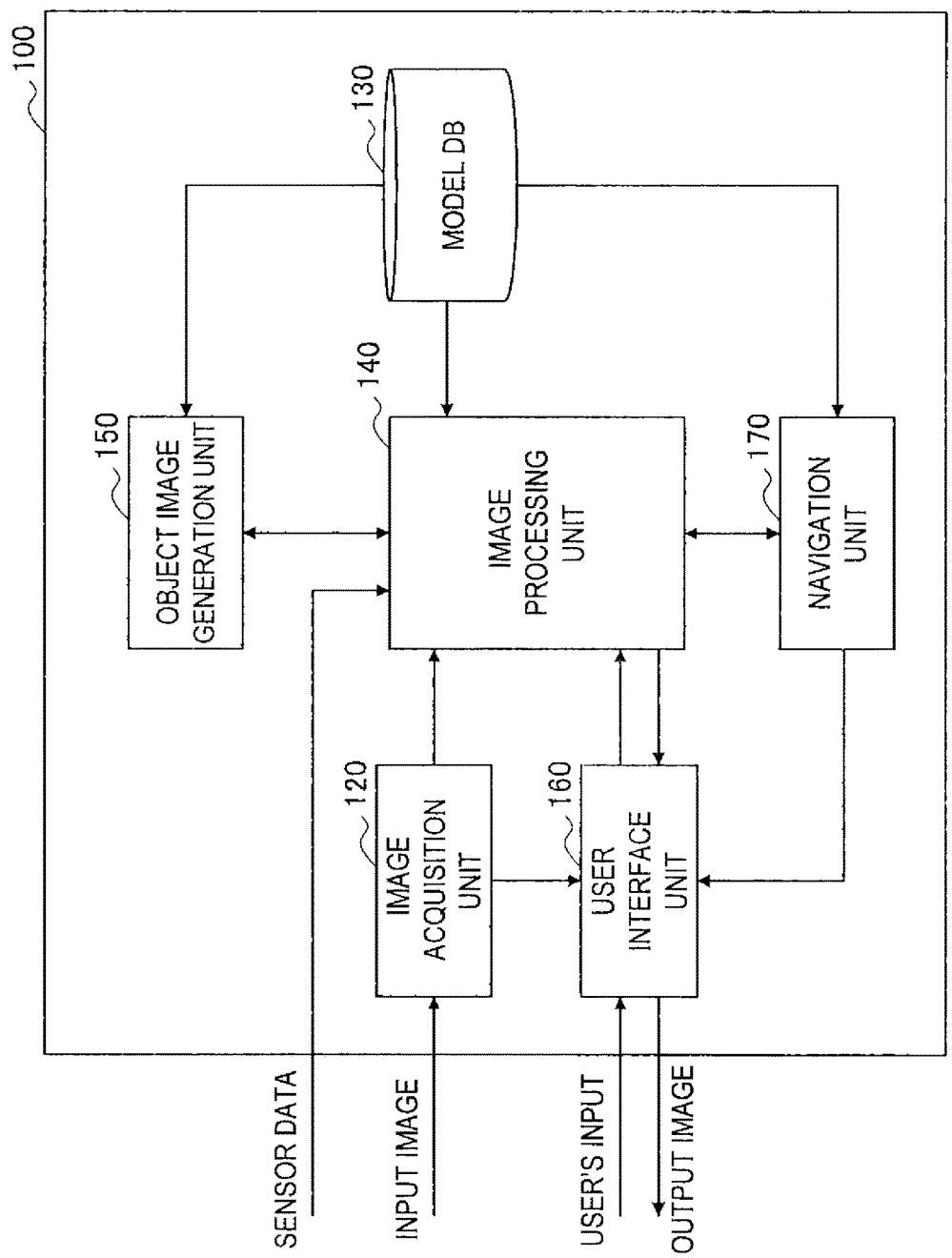

[Fig. 4]
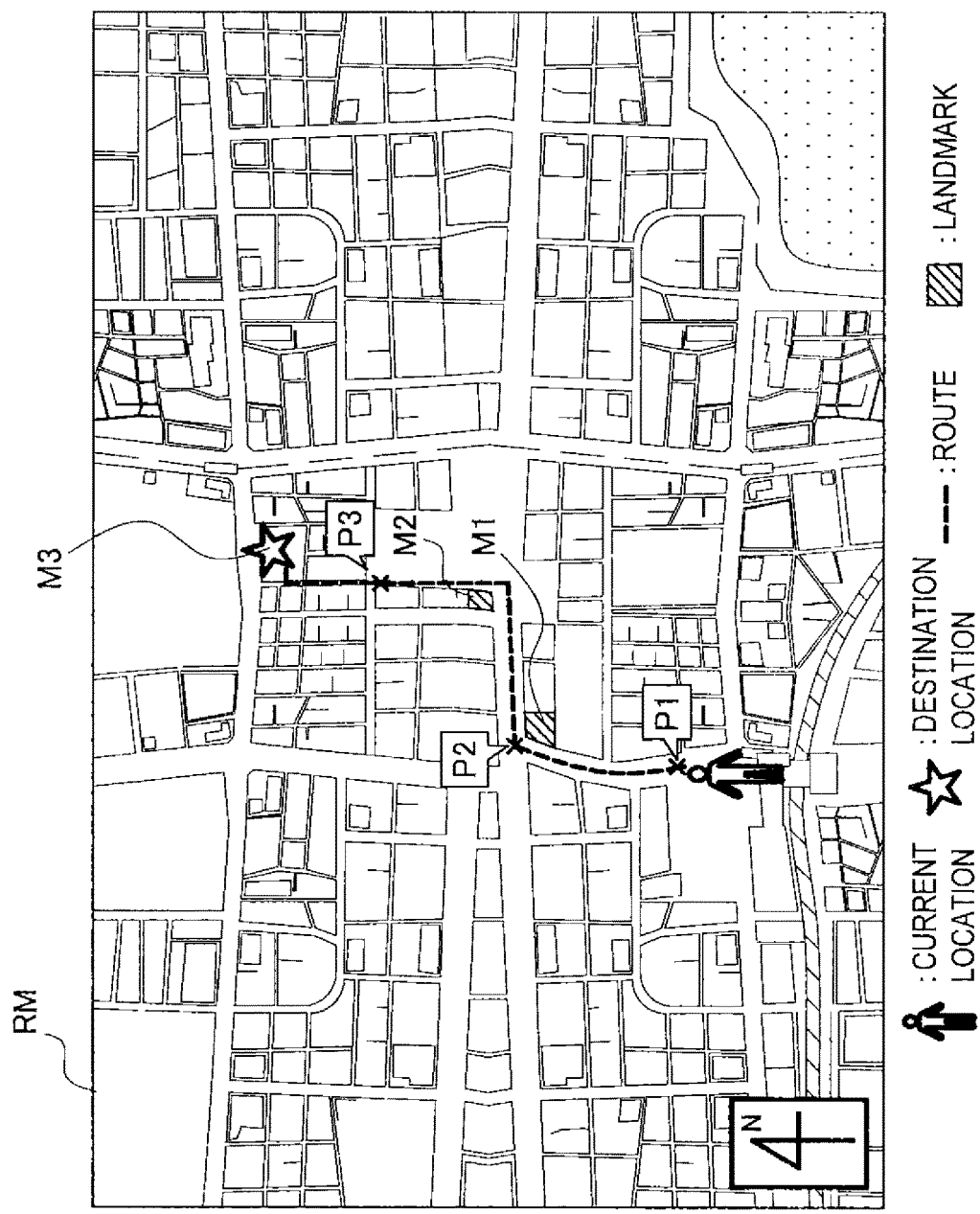

[Fig. 5A]
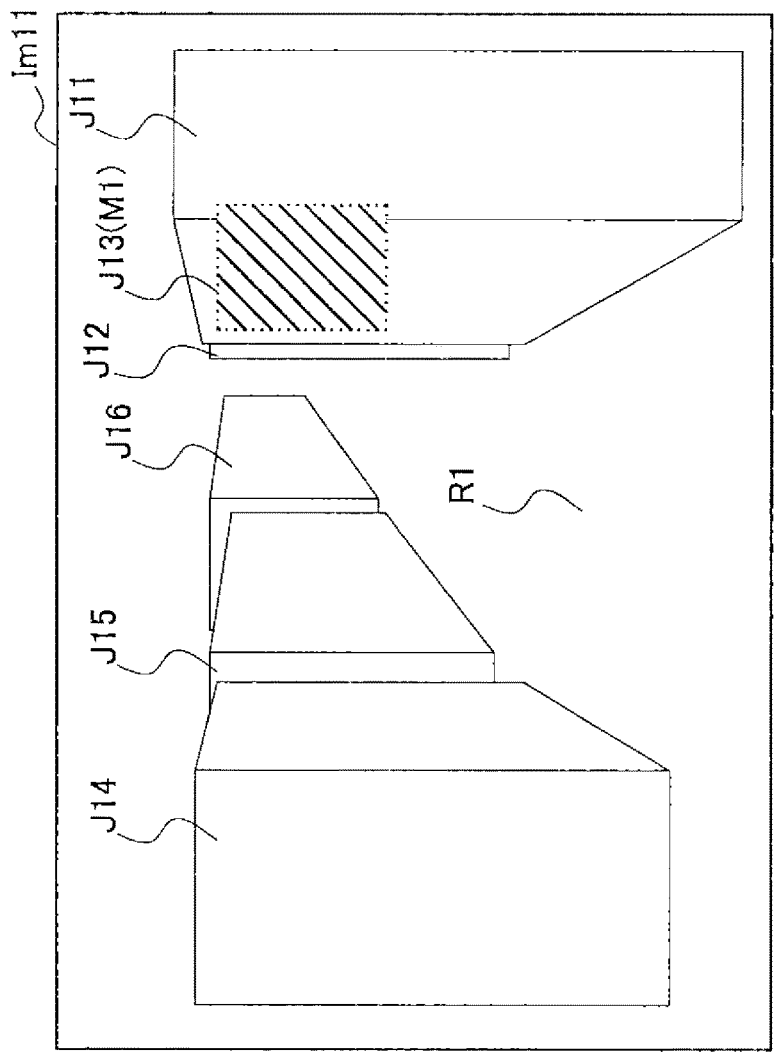

[Fig. 5B]
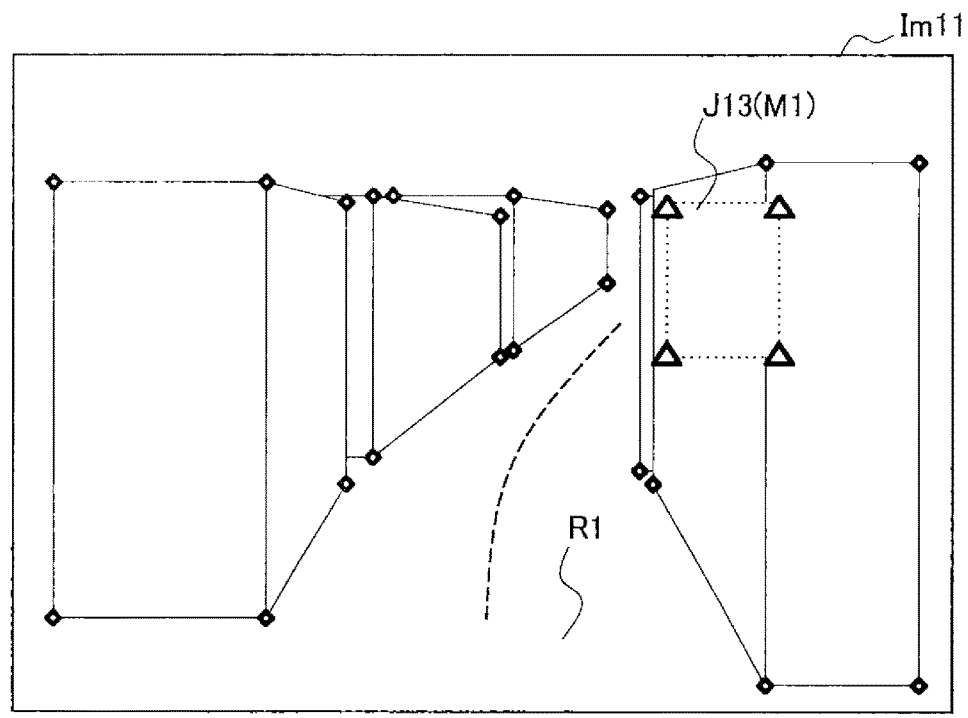
◇ : VISIBLE CHARACTERISTIC POINTS  △ : HIDDEN CHARACTERISTIC POINTS
[Fig. 5C]
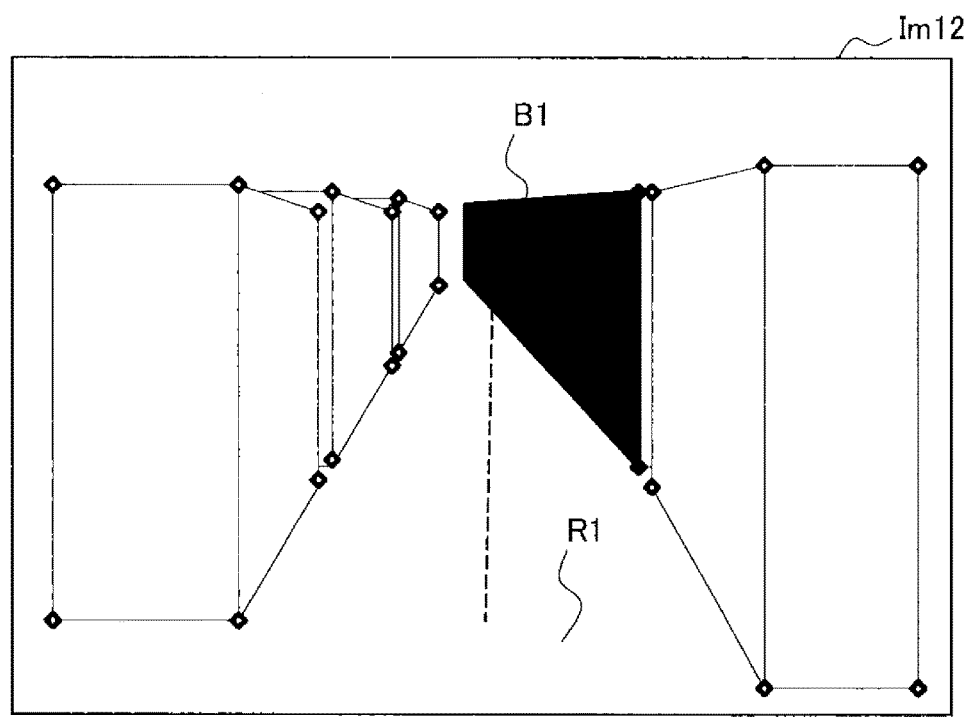
■ : BLANK PORTION

[Fig. 5D]
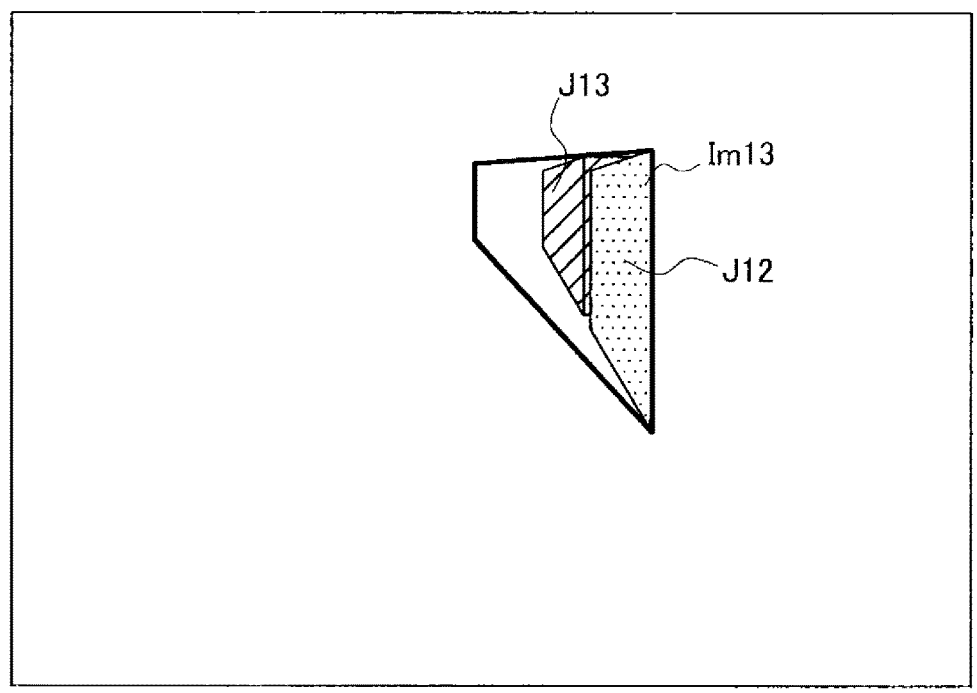
[Fig. 5E]
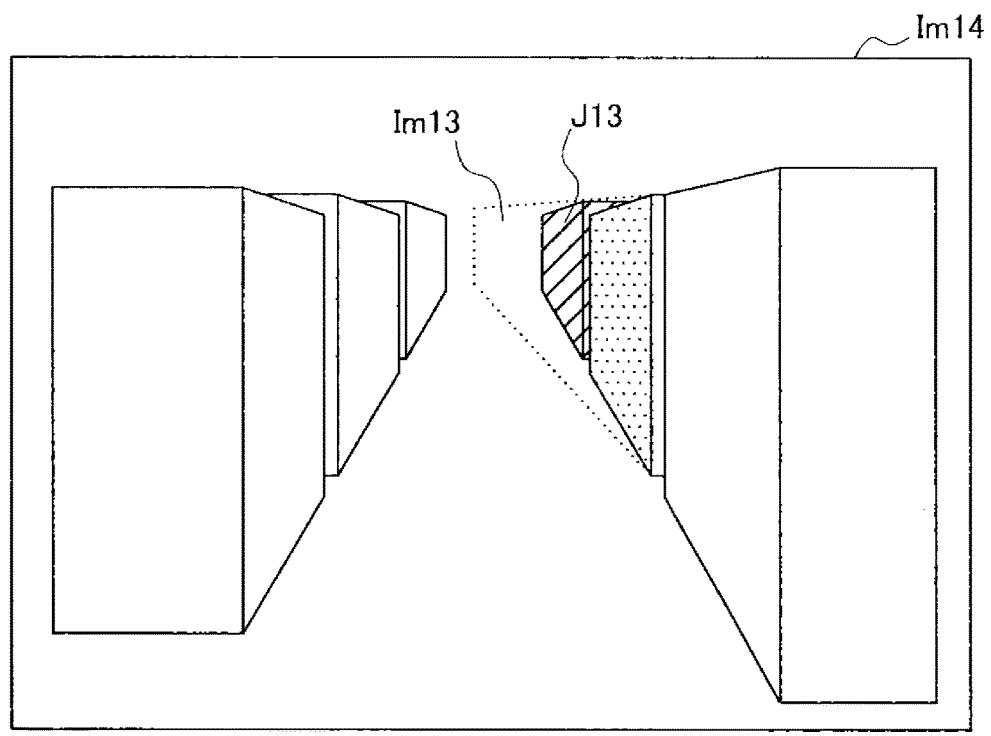

[Fig. 6A]
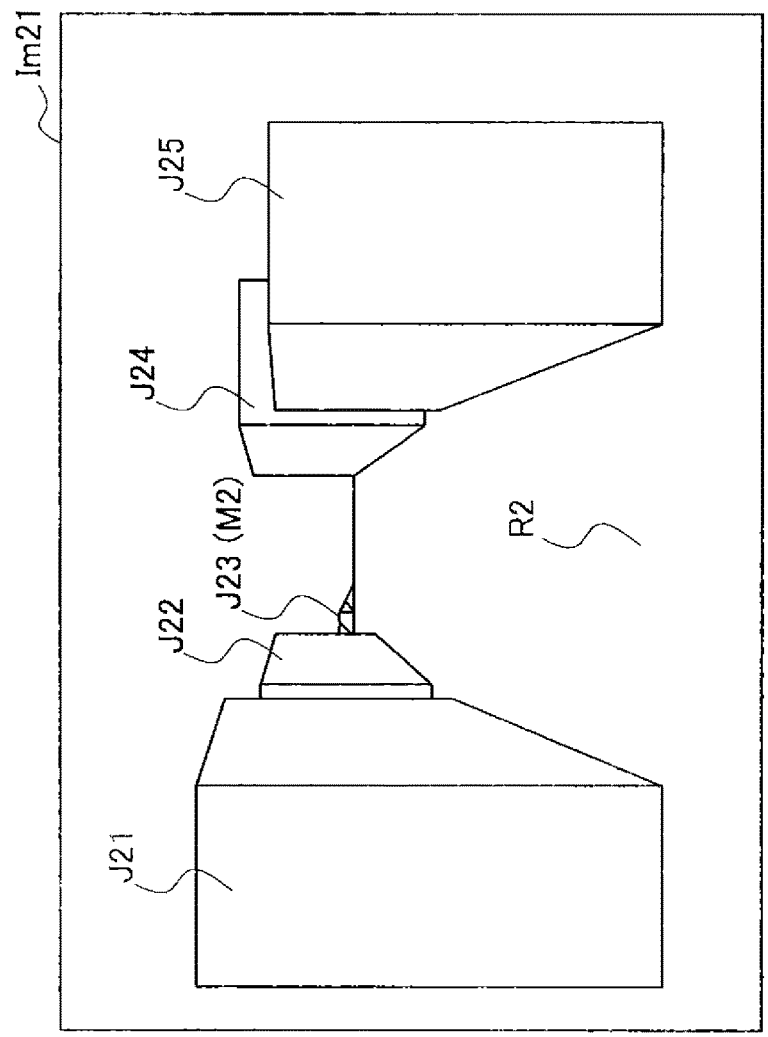

[Fig. 6B]
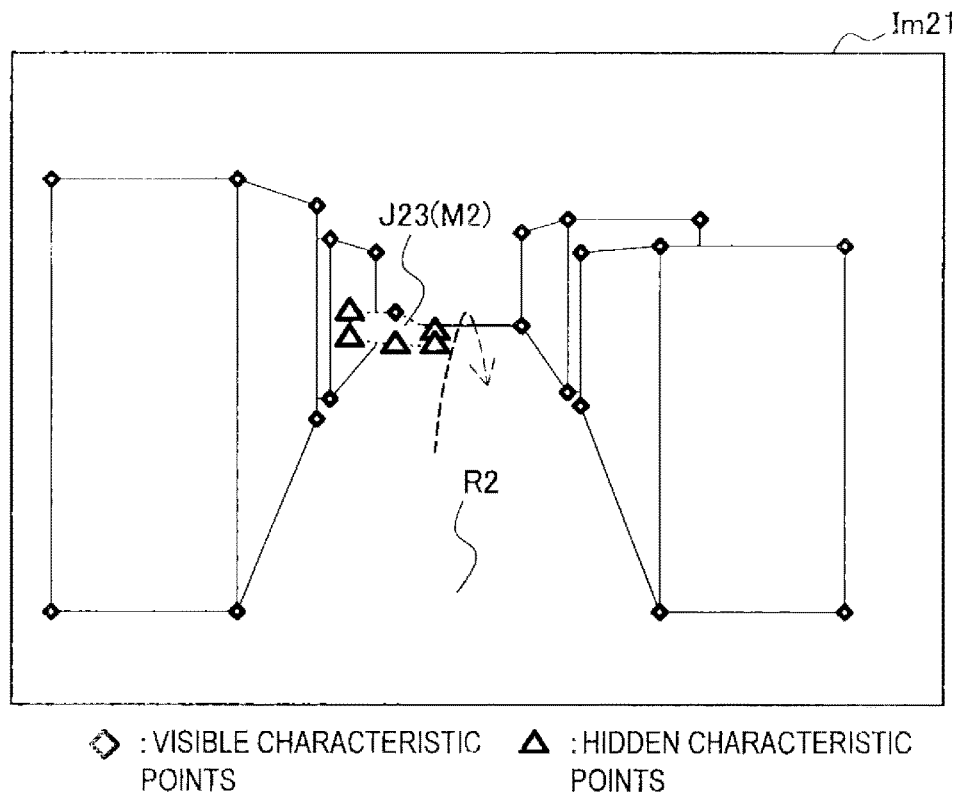
◇ : VISIBLE CHARACTERISTIC POINTS  △ : HIDDEN CHARACTERISTIC POINTS
[Fig. 6C]
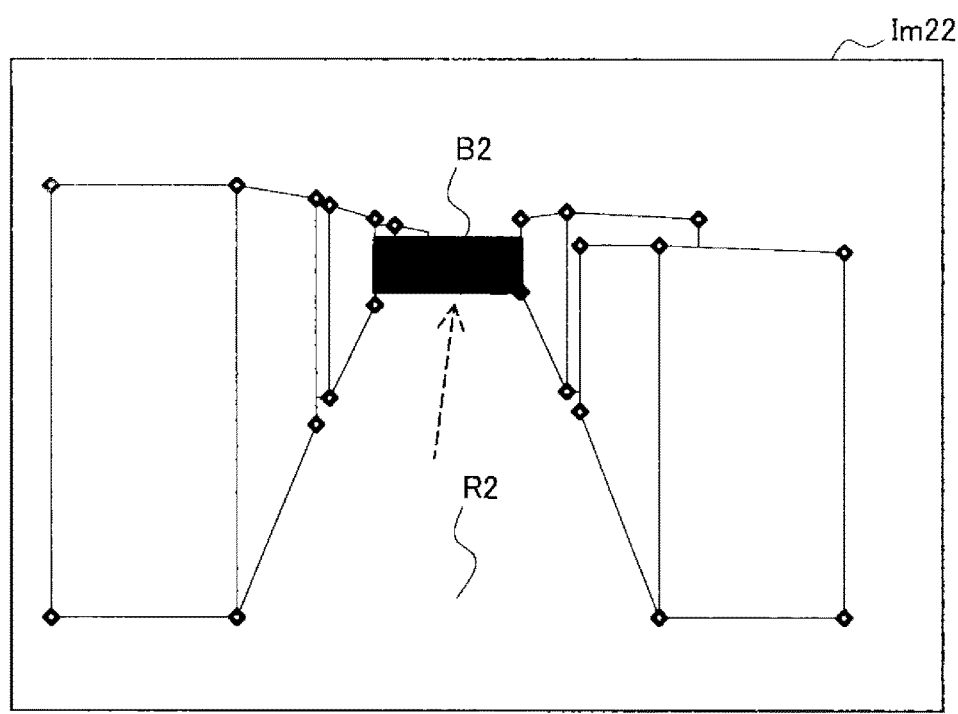
■ : BLANK PORTION

[Fig. 6D]
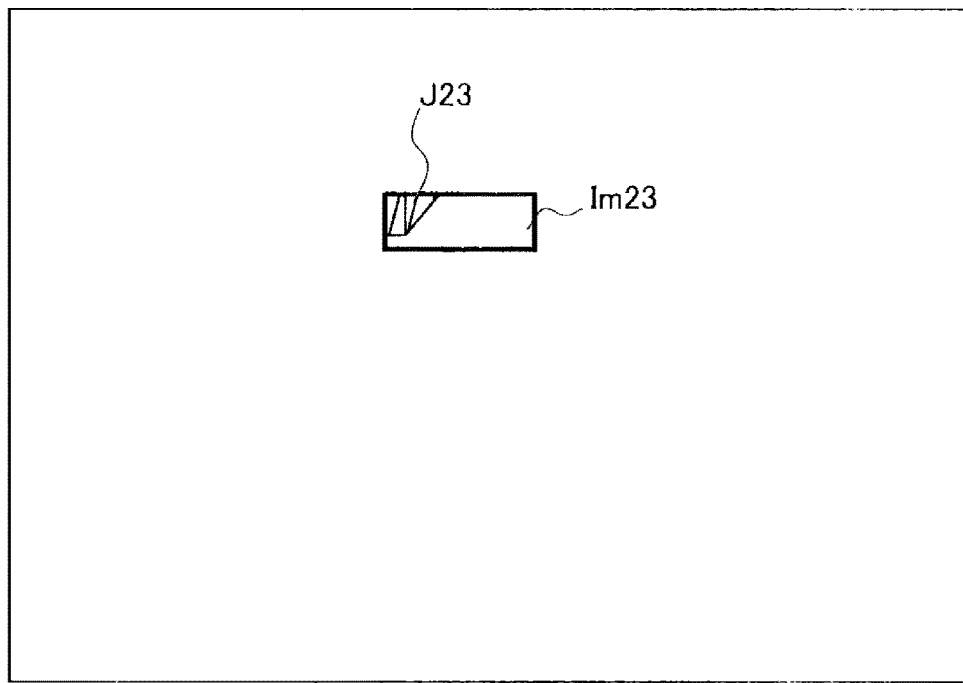
[Fig. 6E]
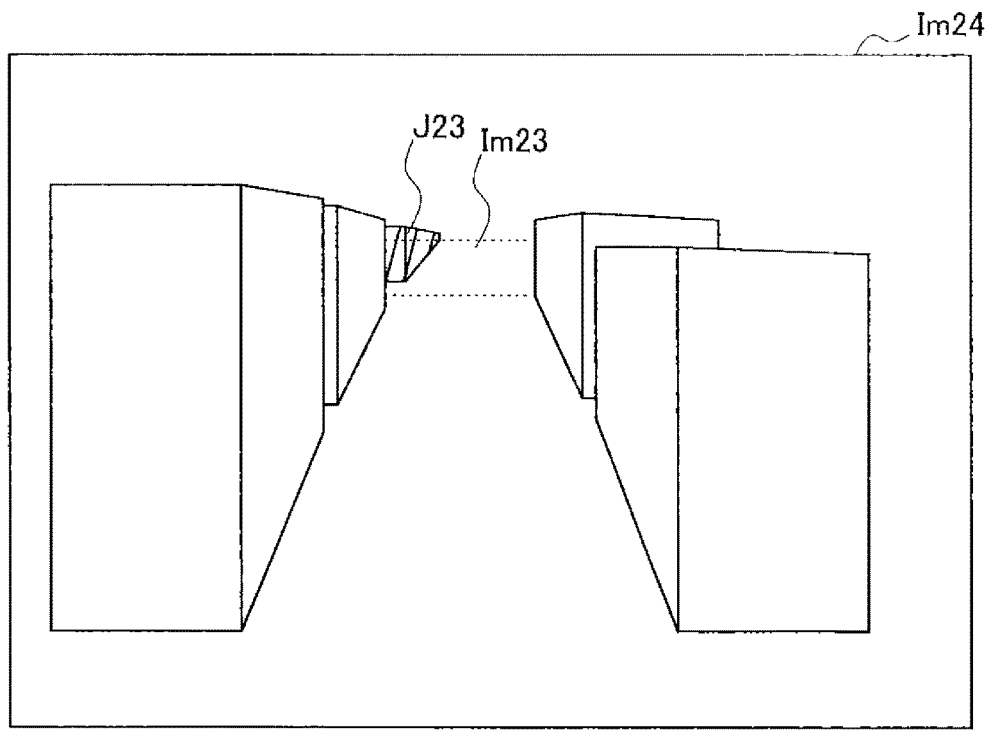

[Fig. 7A]
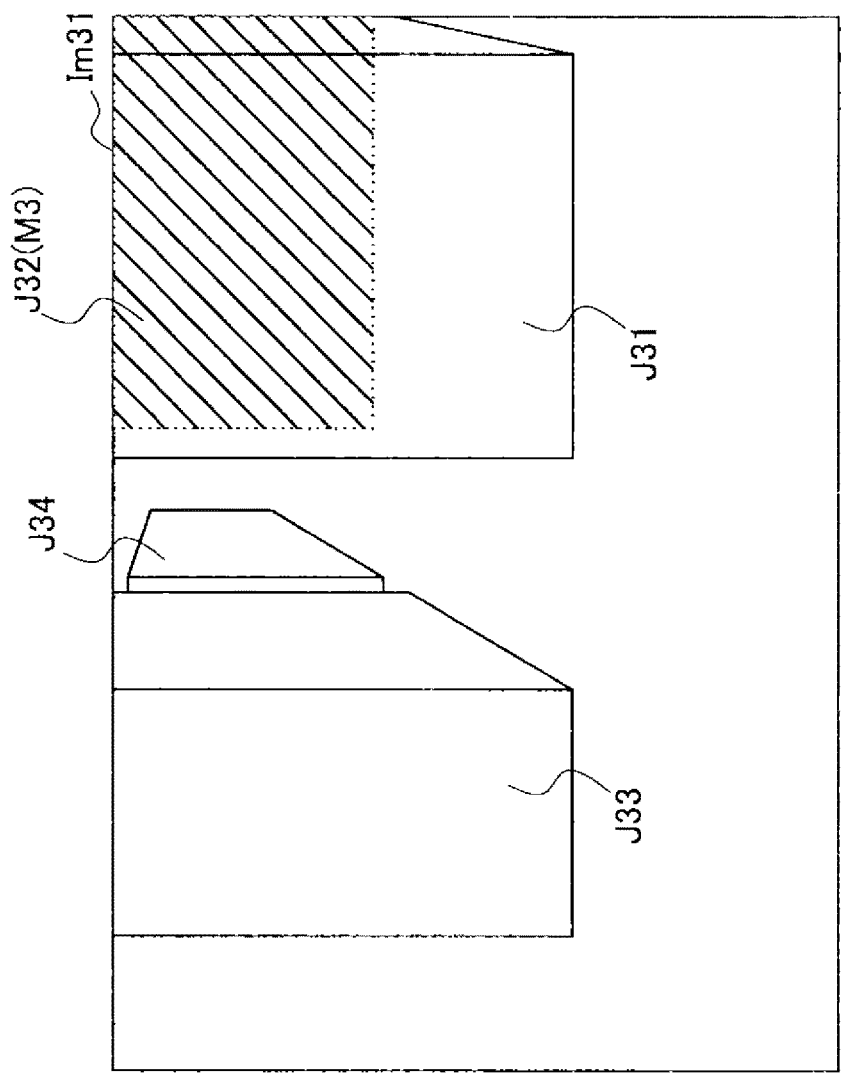

[Fig. 7B]
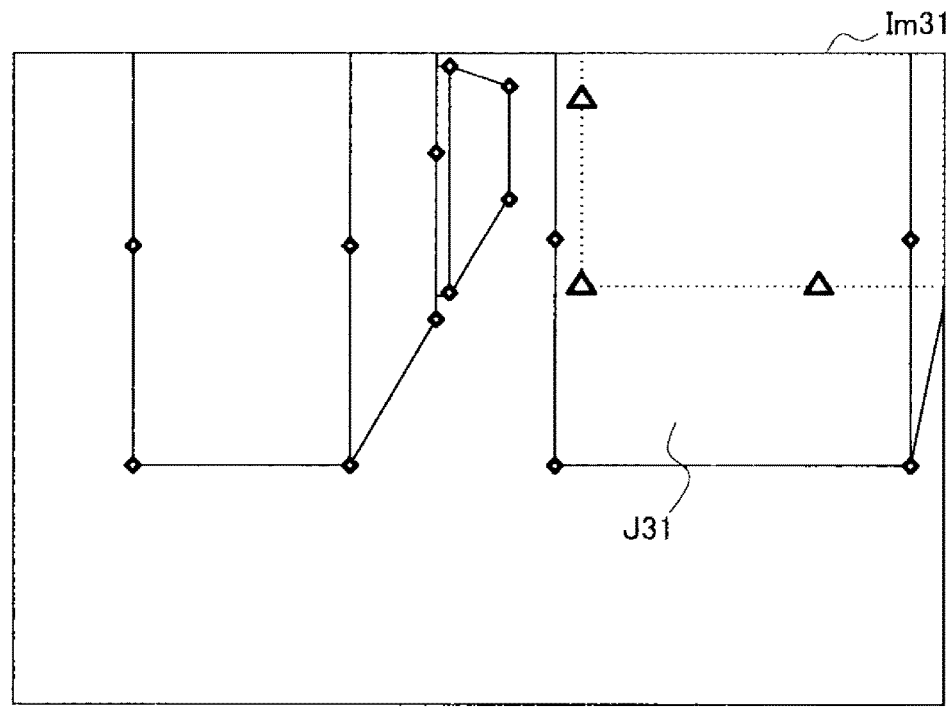
◇ : VISIBLE CHARACTERISTIC POINTS    △ : HIDDEN CHARACTERISTIC POINTS
[Fig. 7C]
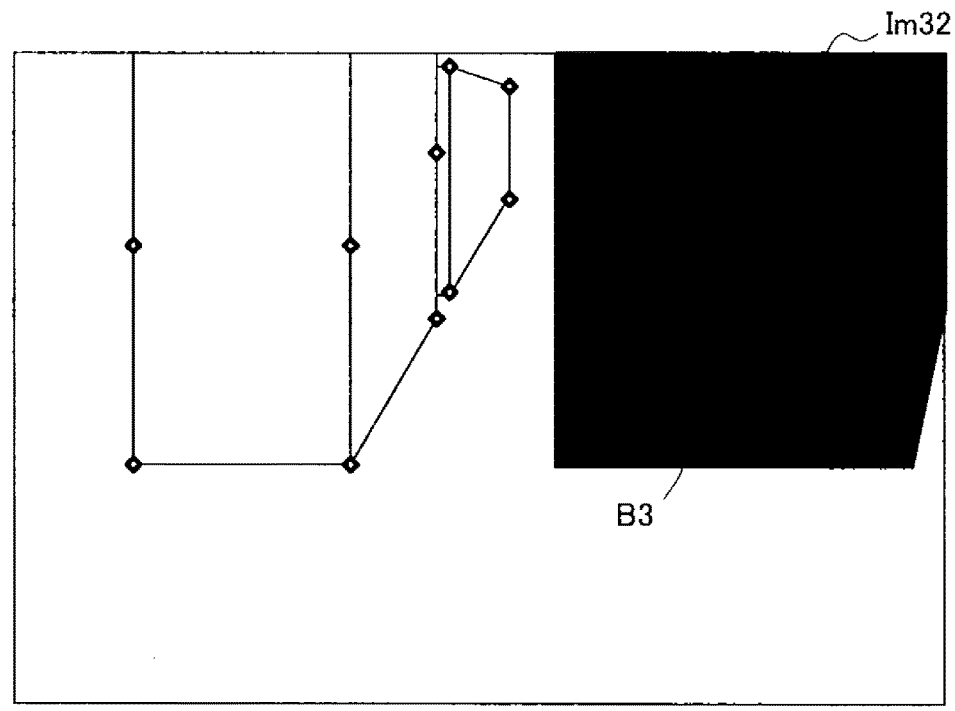
■ : BLANK PORTION

[Fig. 7D]
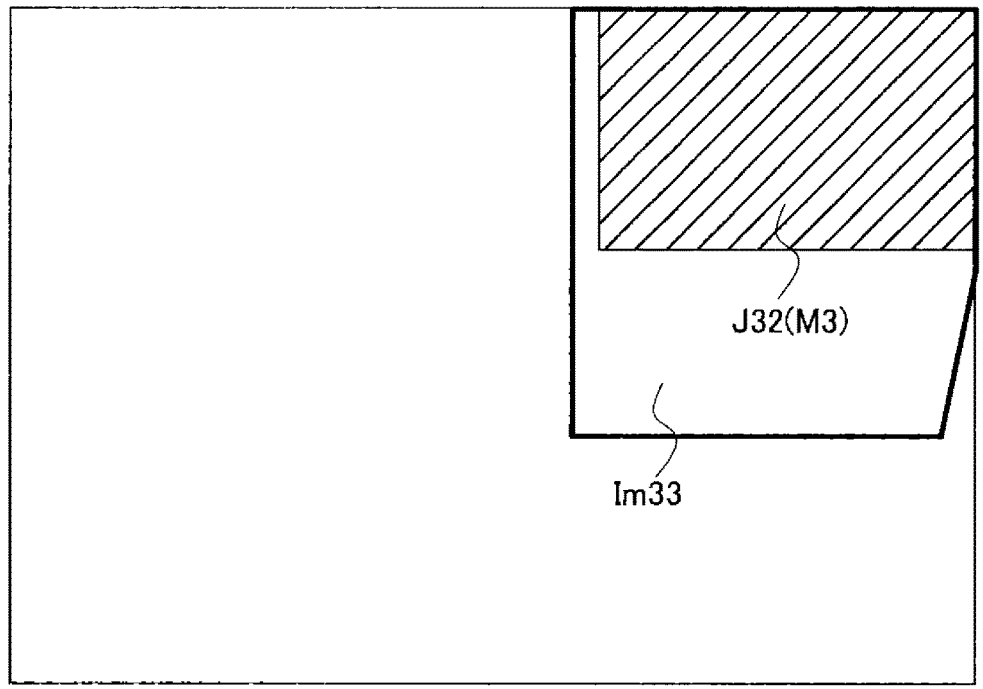
[Fig. 7E]
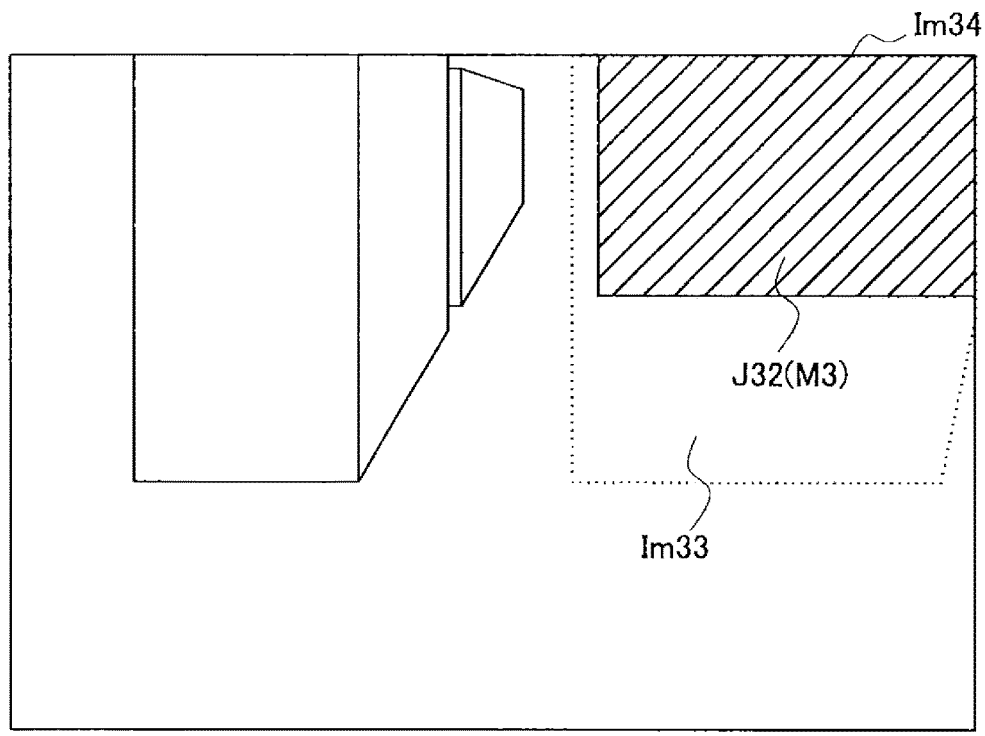

[Fig. 8]
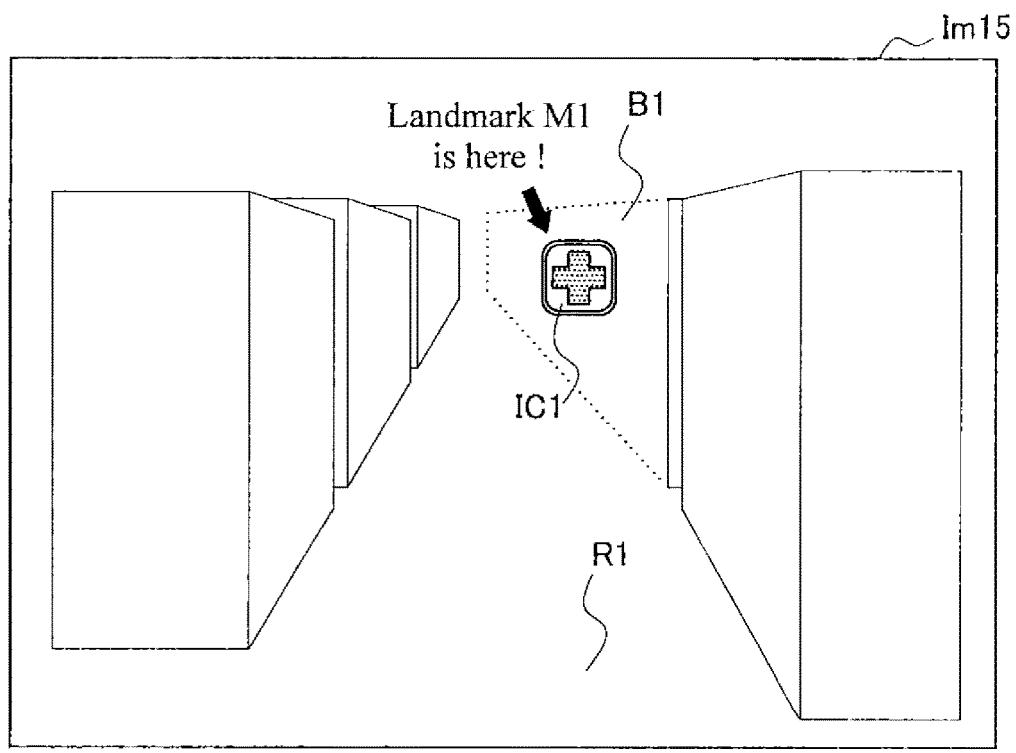

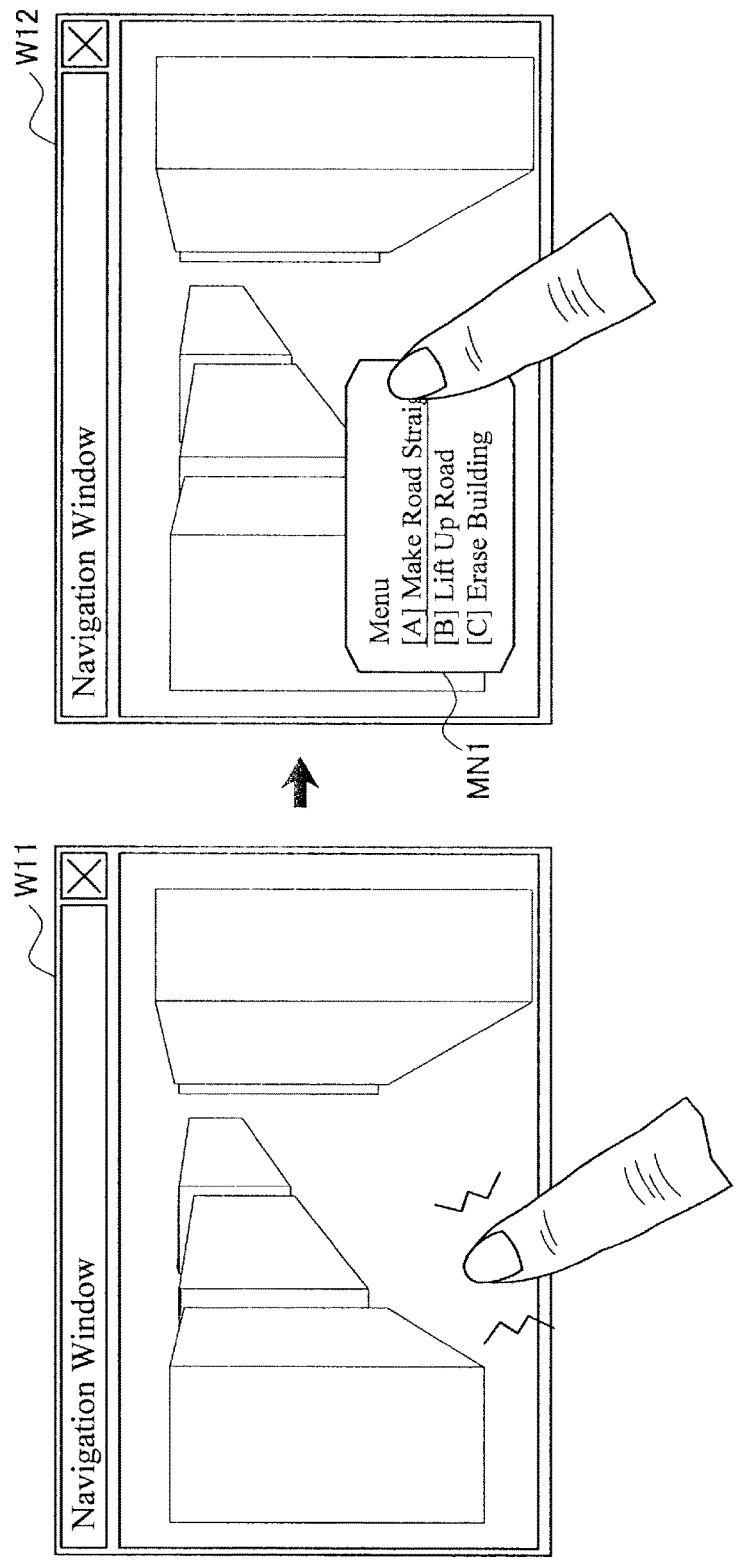
[Fig. 9A]

[Fig. 9B]
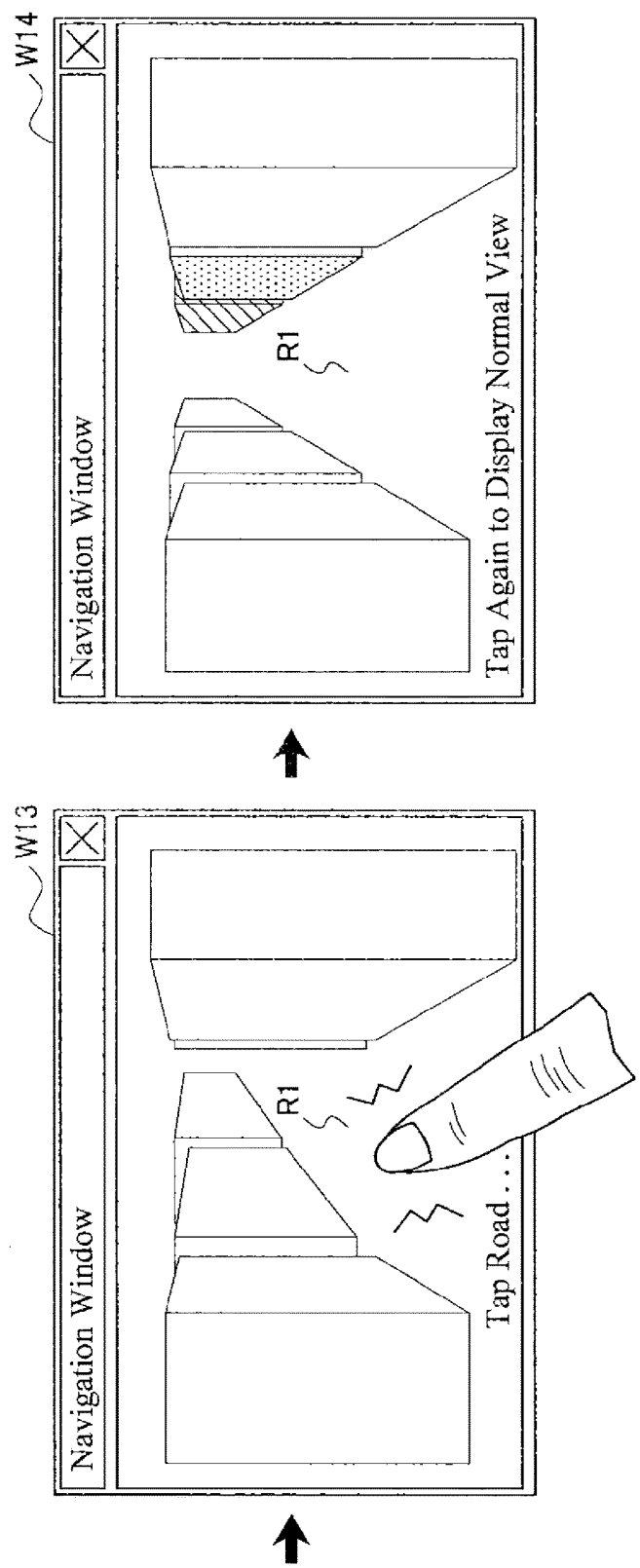

[Fig. 10A]
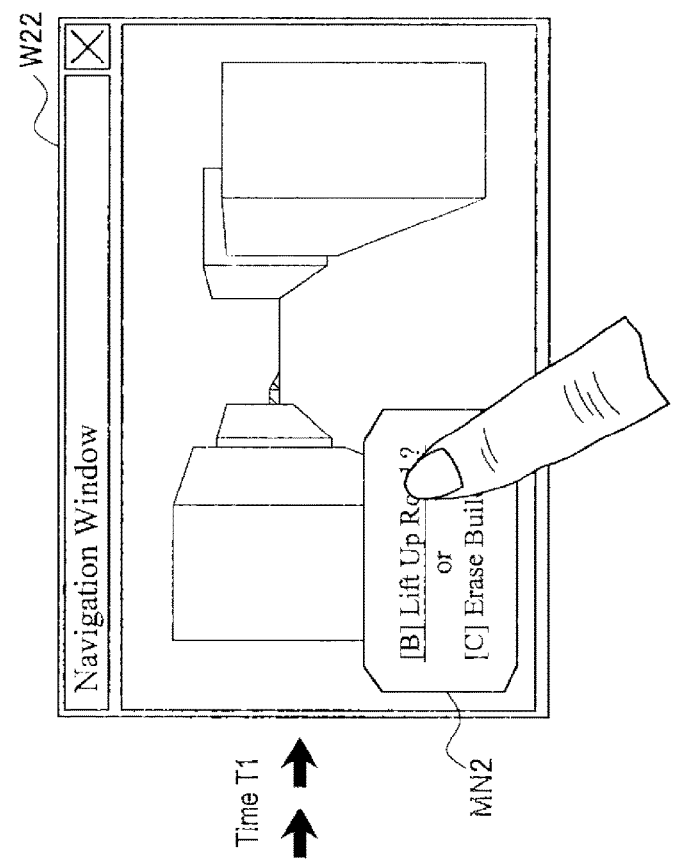
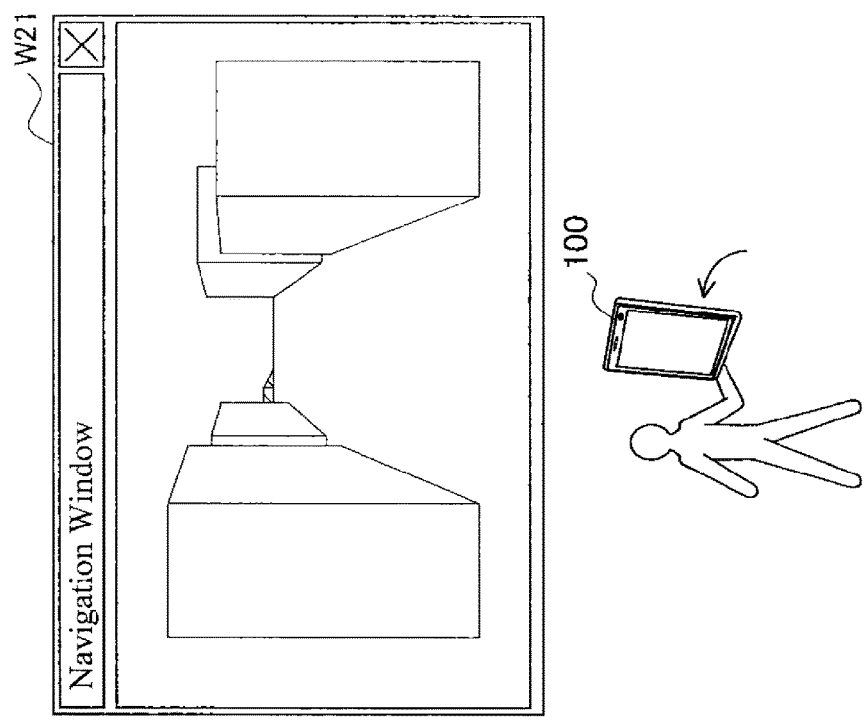

[Fig. 10B]
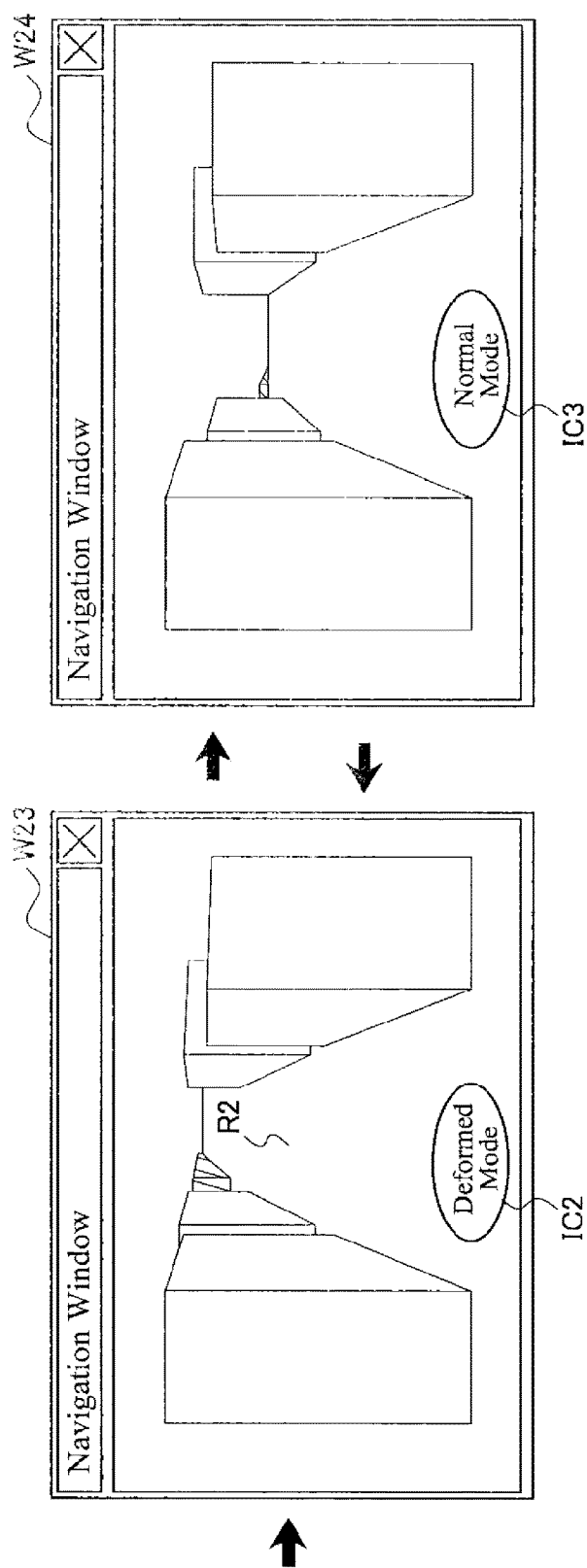

[Fig. 11]
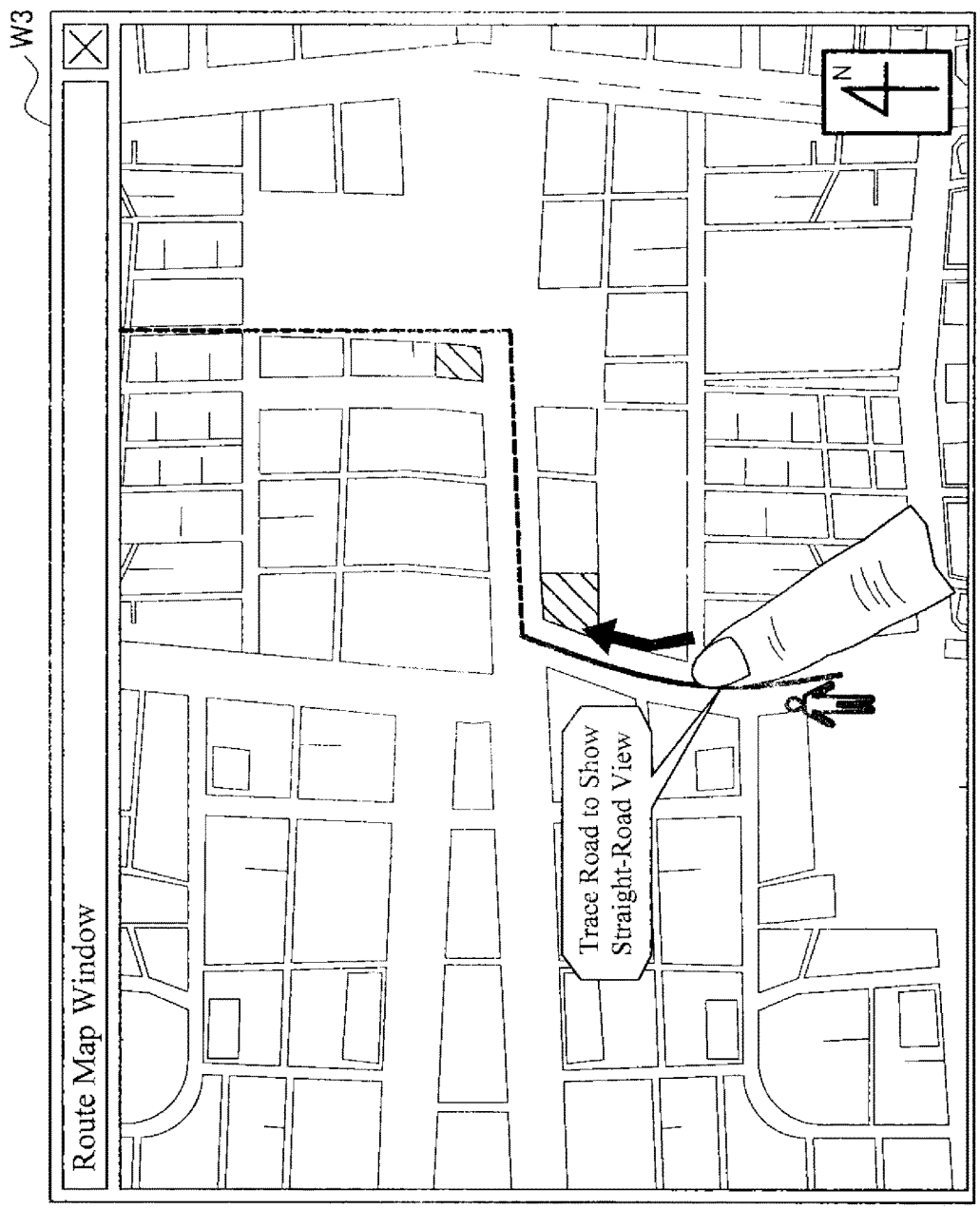

[Fig. 12]
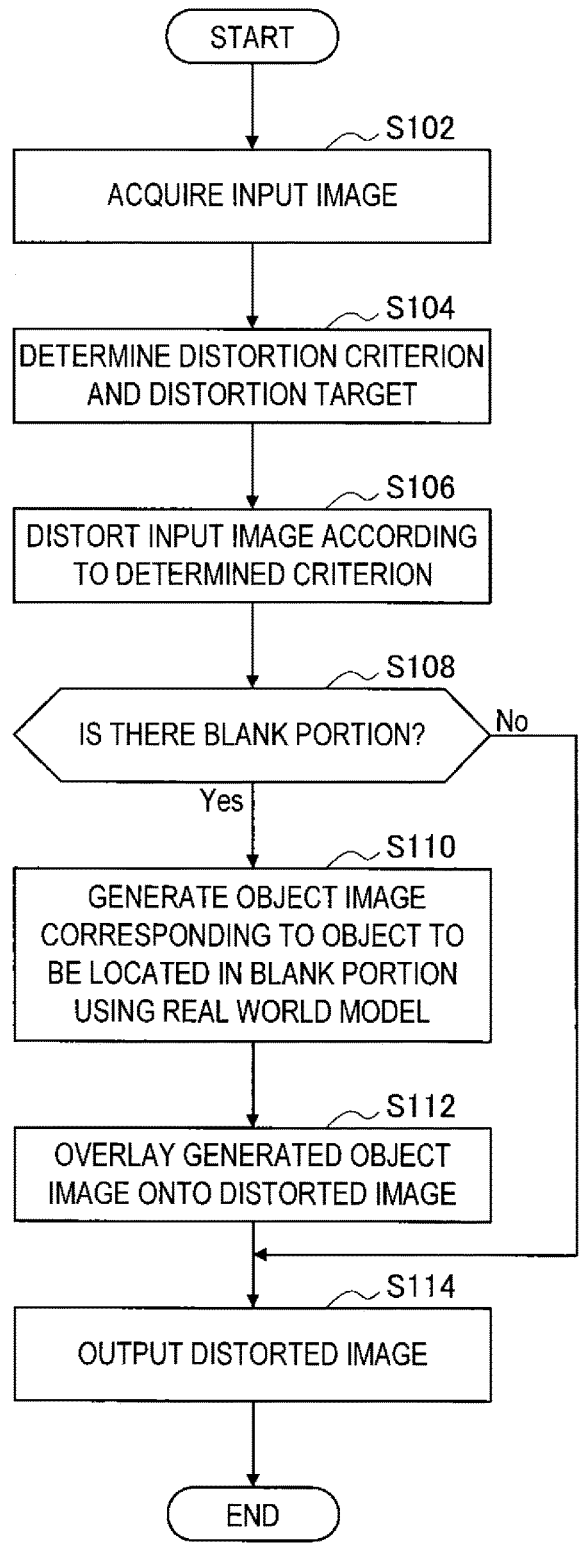

[Fig. 13]
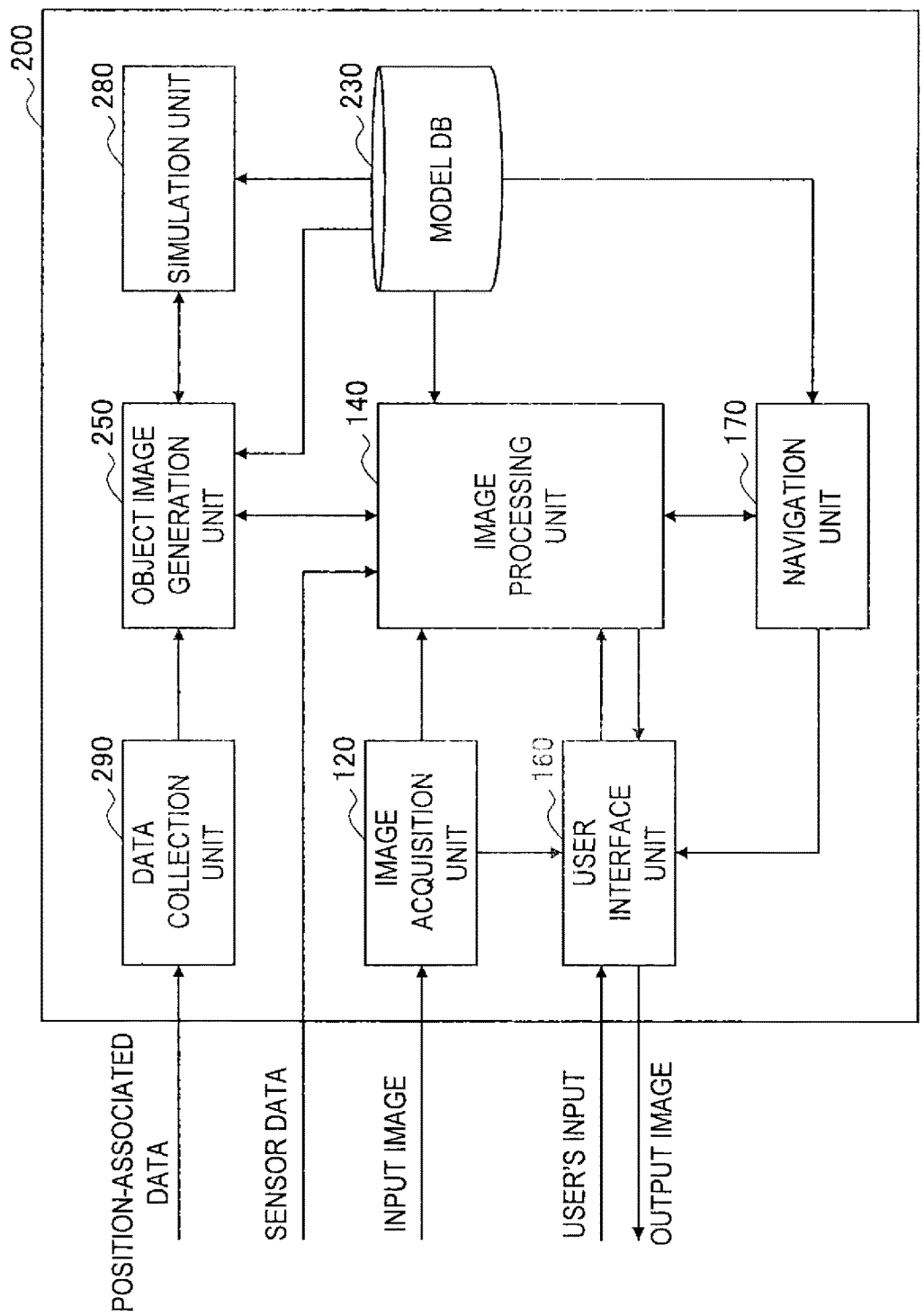

[Fig. 14]
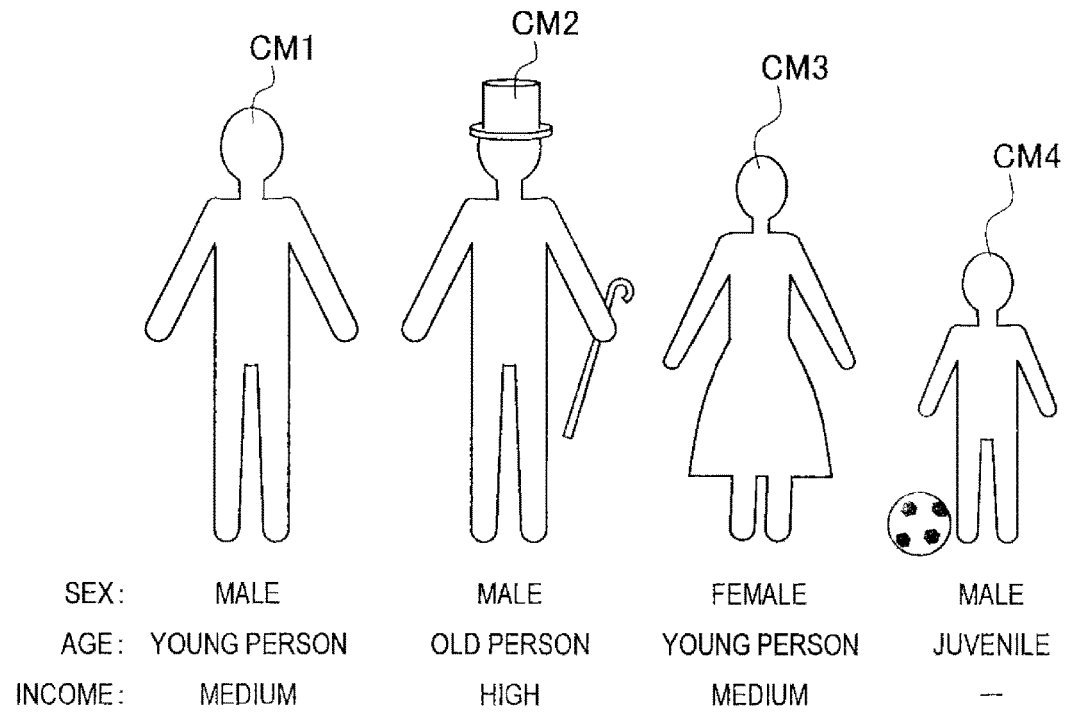
| | | | | |
|---|---|---|---|---|
| SEX: | MALE | MALE | FEMALE | MALE |
| AGE: | YOUNG PERSON | OLD PERSON | YOUNG PERSON | JUVENILE |
| INCOME: | MEDIUM | HIGH | MEDIUM | -- |
[Fig. 15]
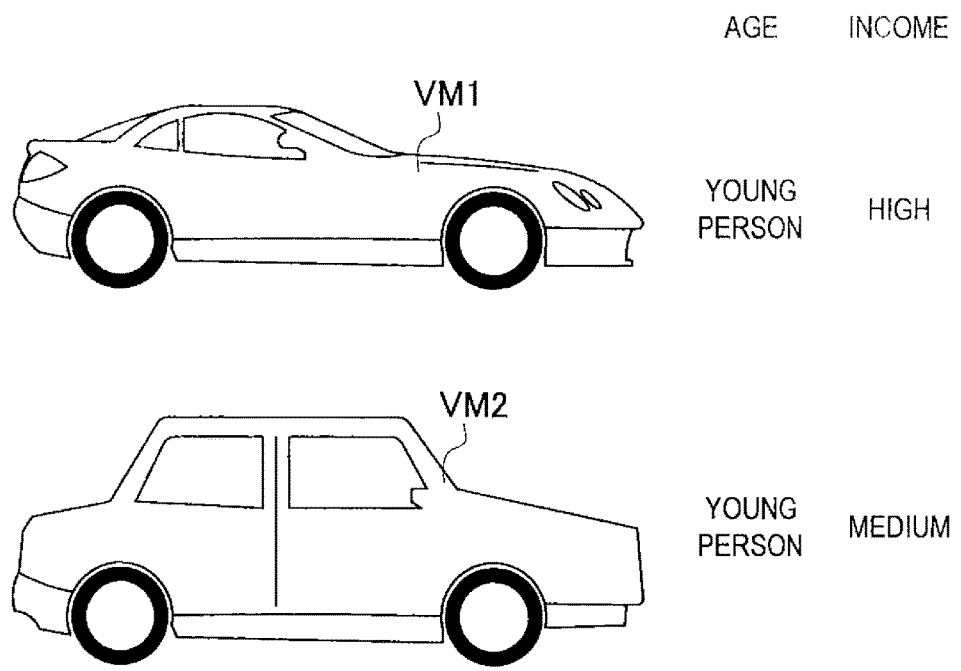

[Fig. 16A]
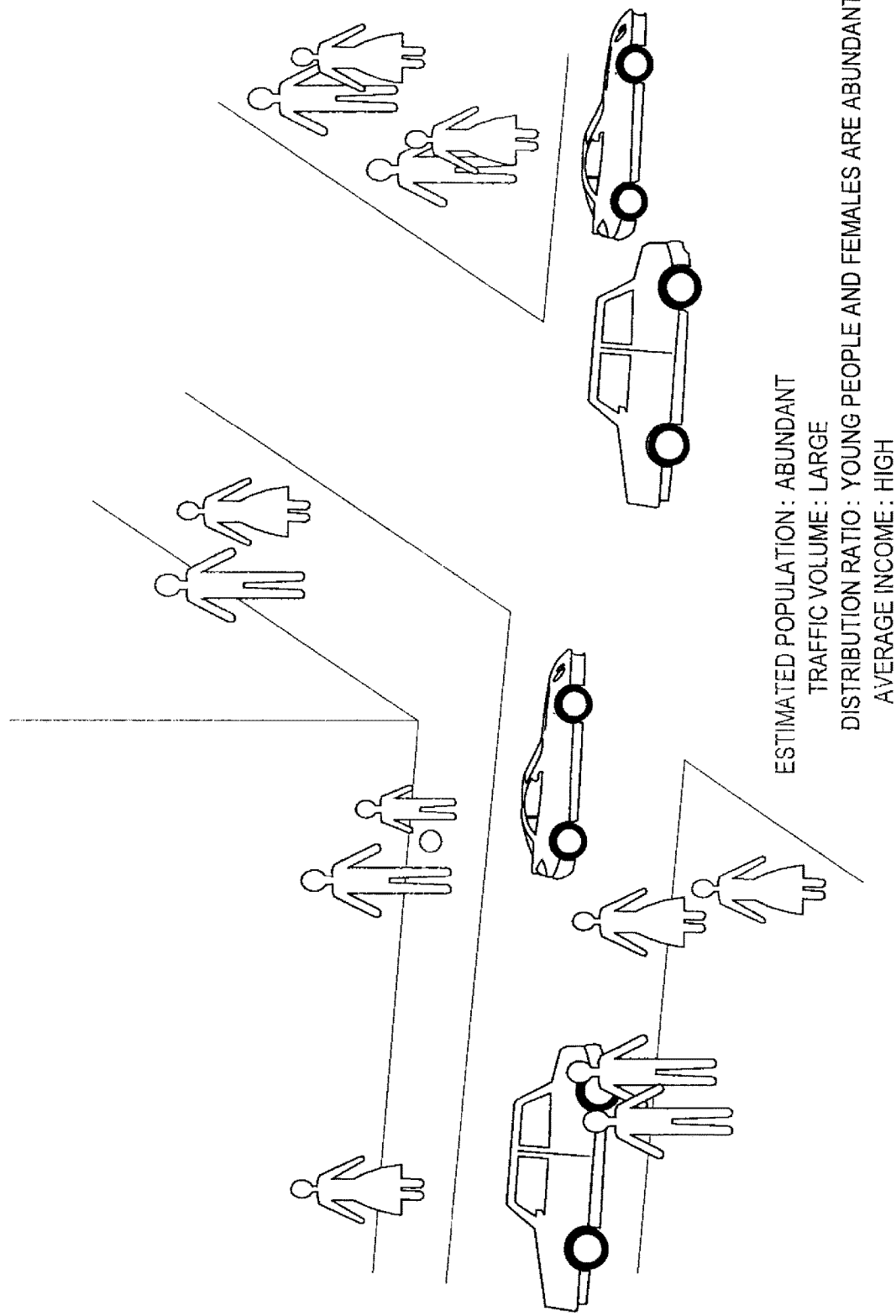

[Fig. 16B]
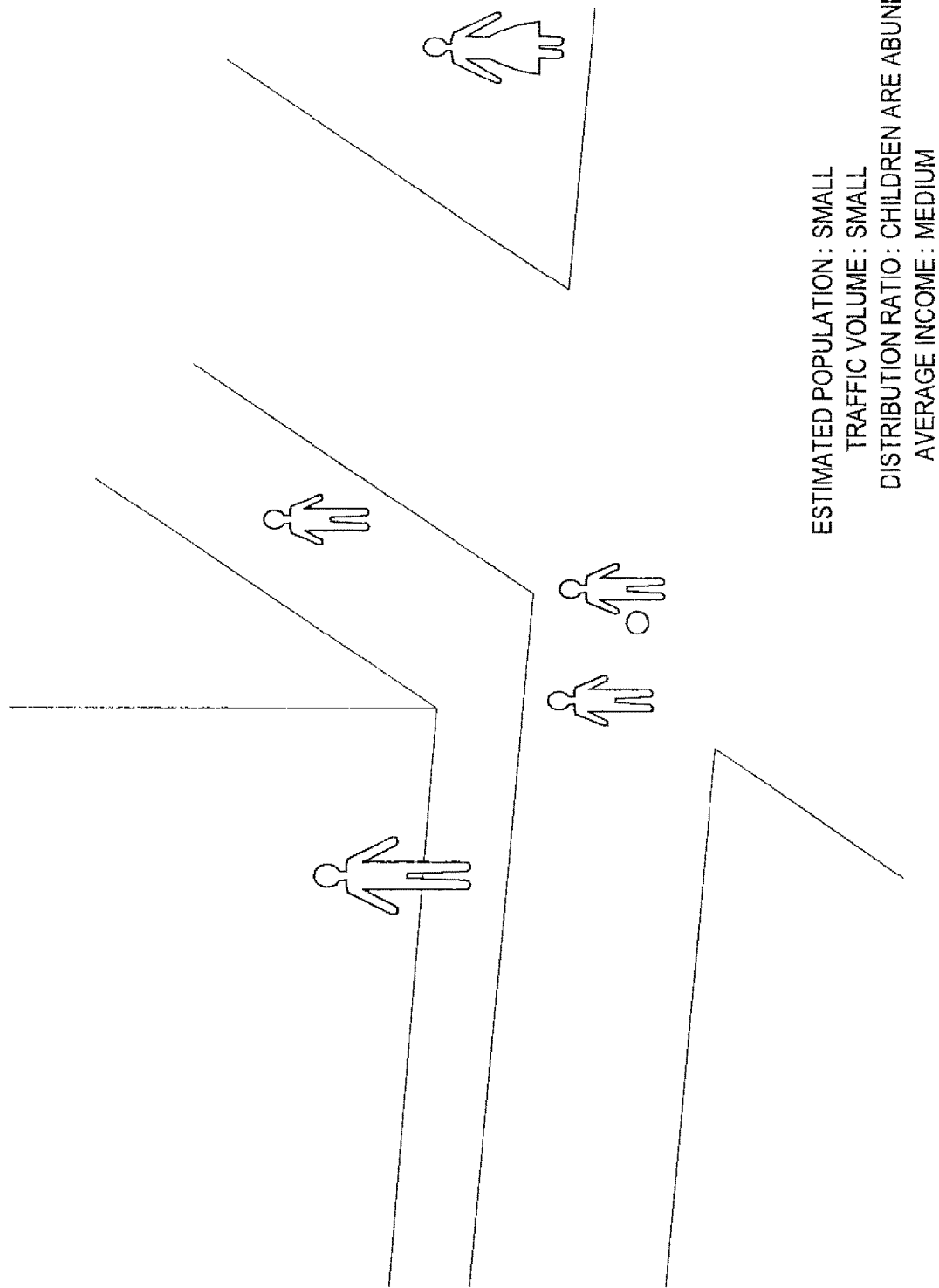

[Fig. 16C]
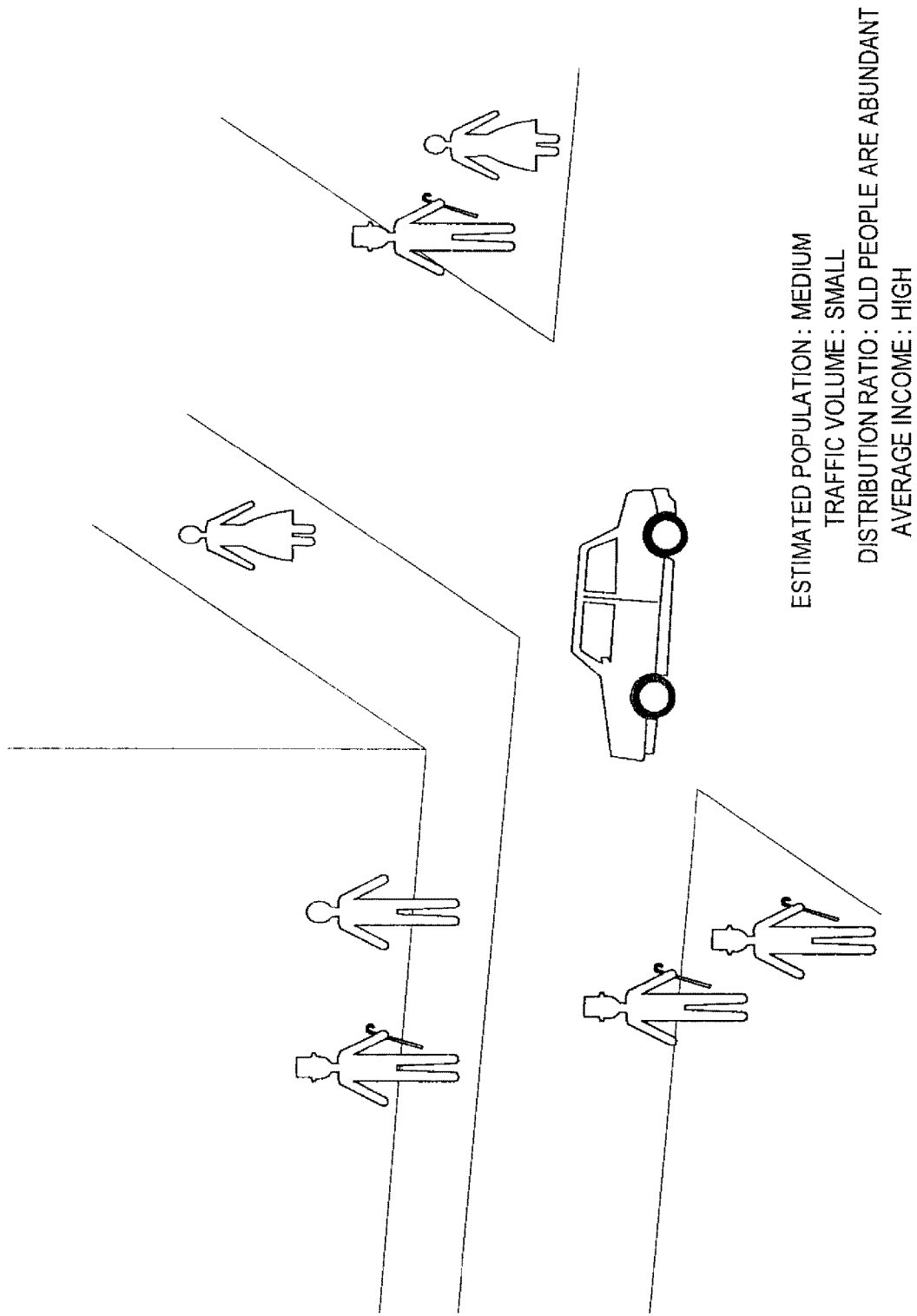

[Fig. 17]
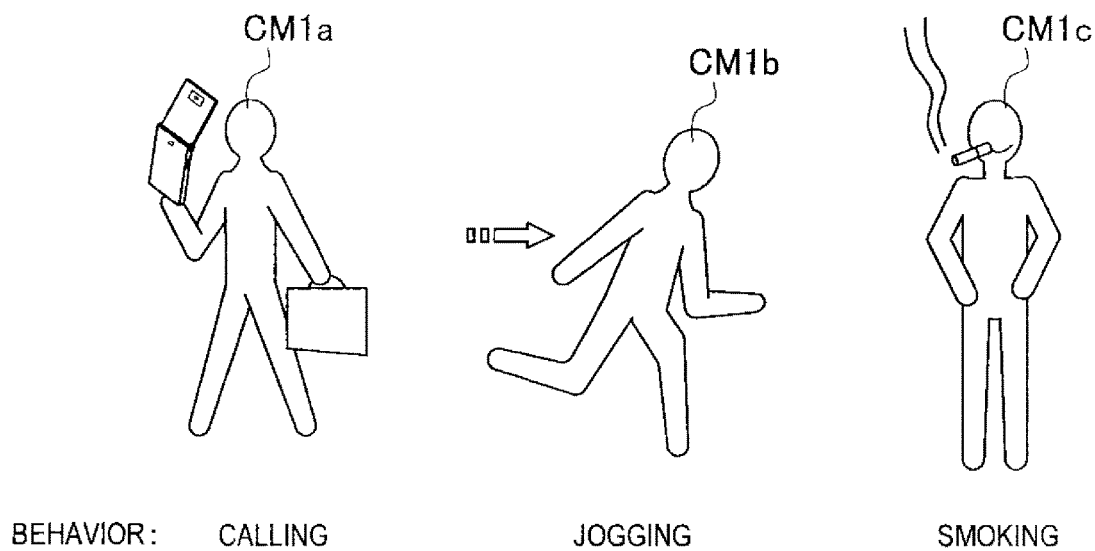
BEHAVIOR:    CALLING            JOGGING            SMOKING
[Fig. 18]
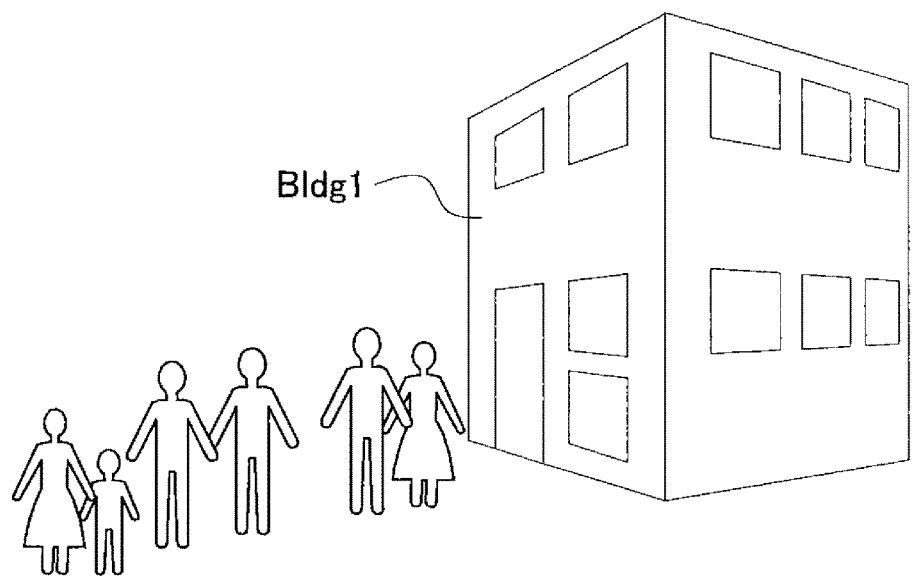

[Fig. 19]
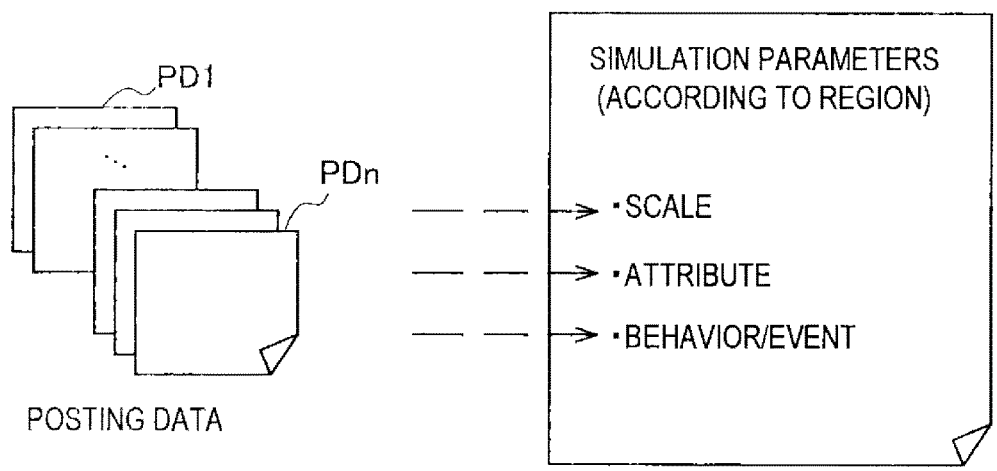
[Fig. 20A]
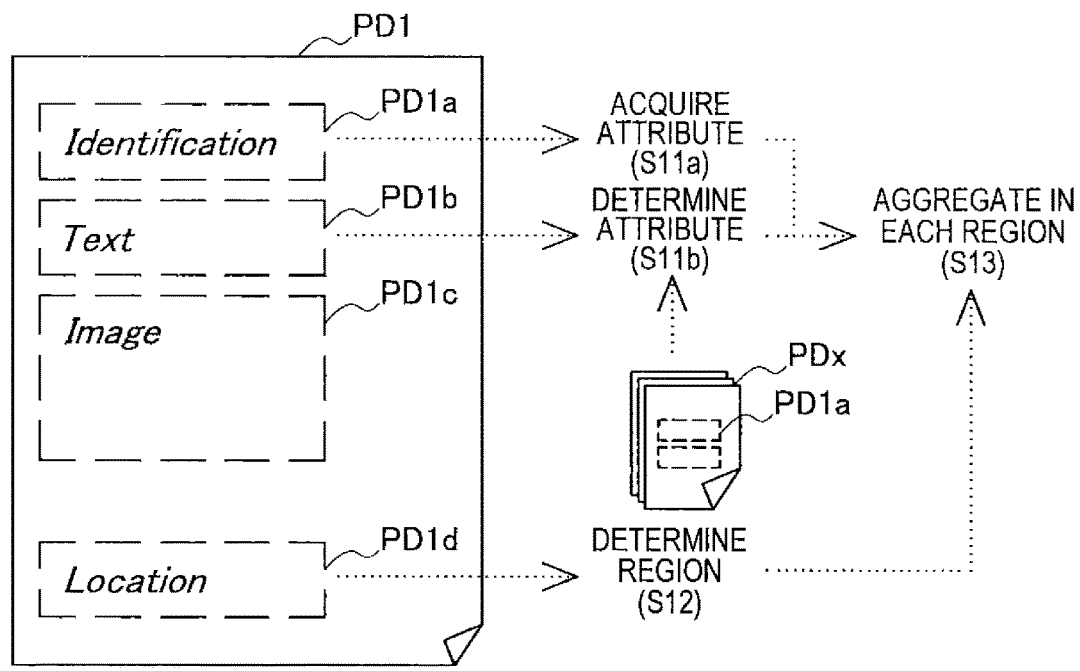

[Fig. 20B]
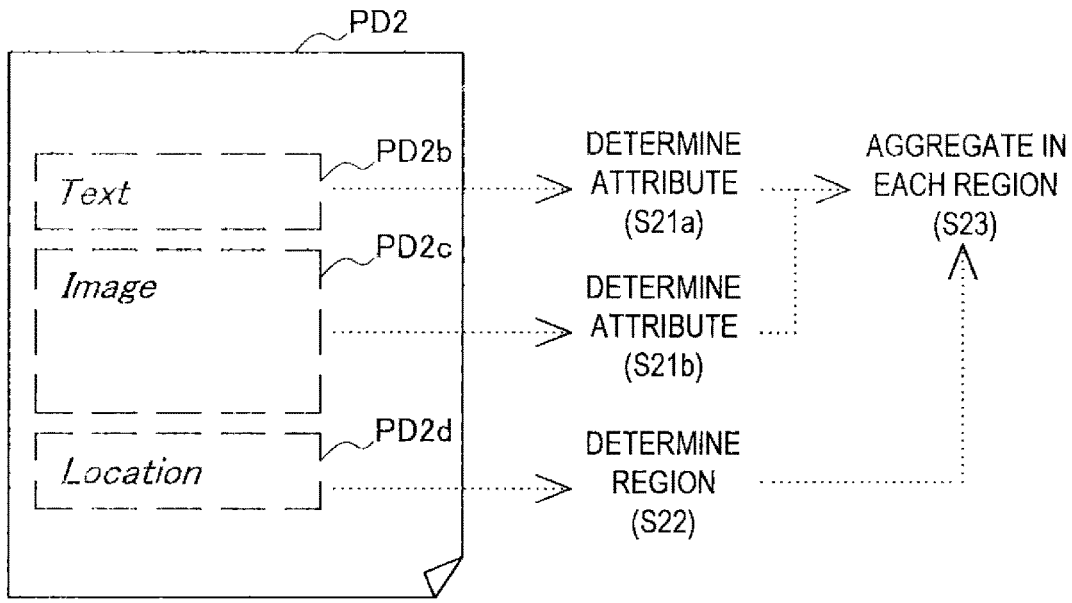
[Fig. 20C]
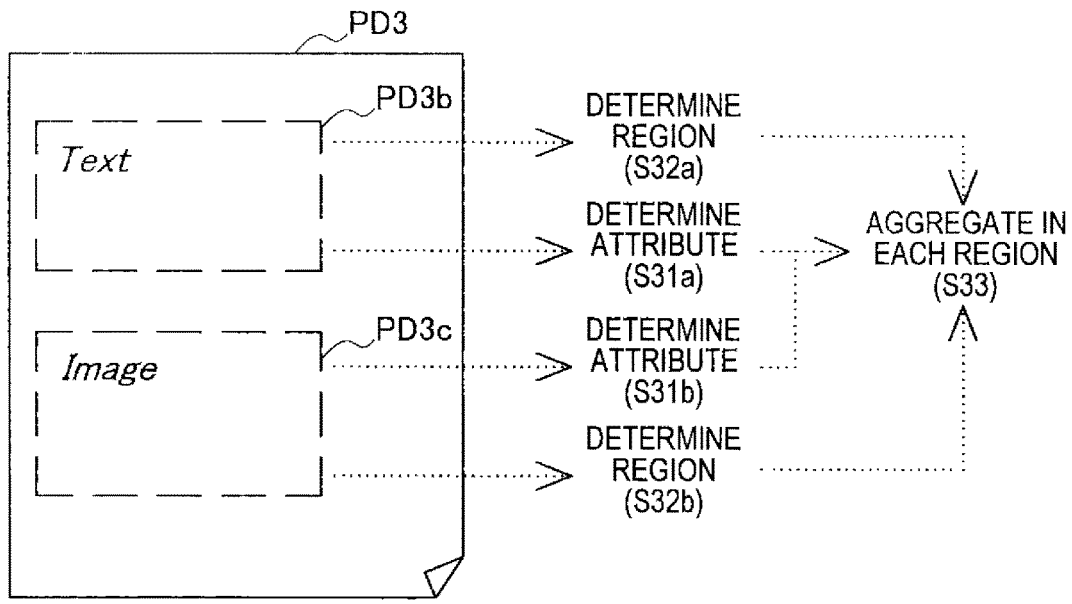

[Fig. 20D]
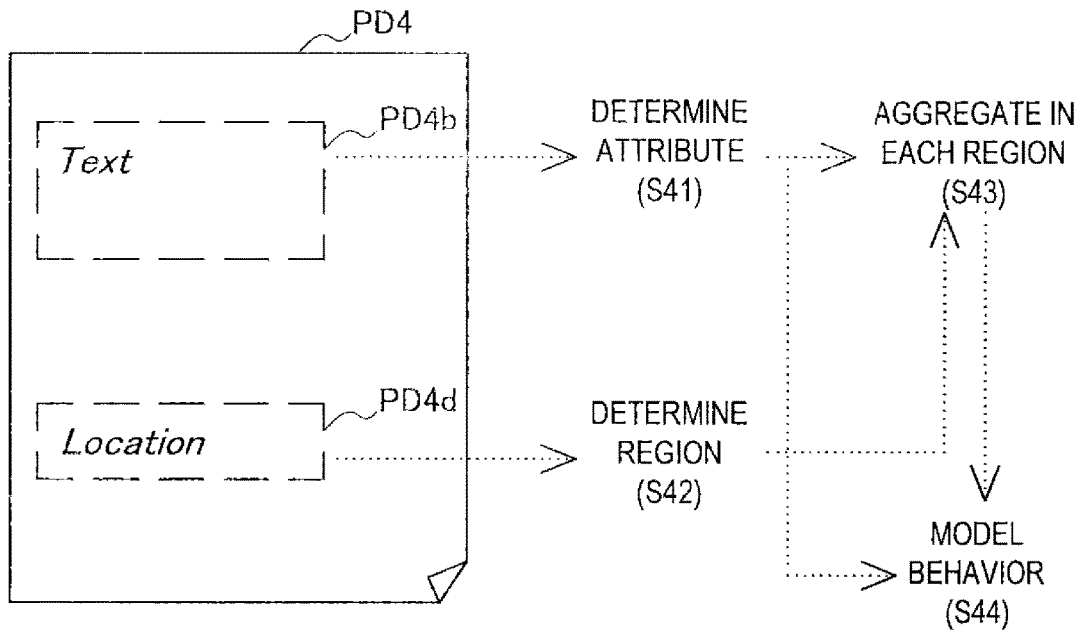
[Fig. 20E]
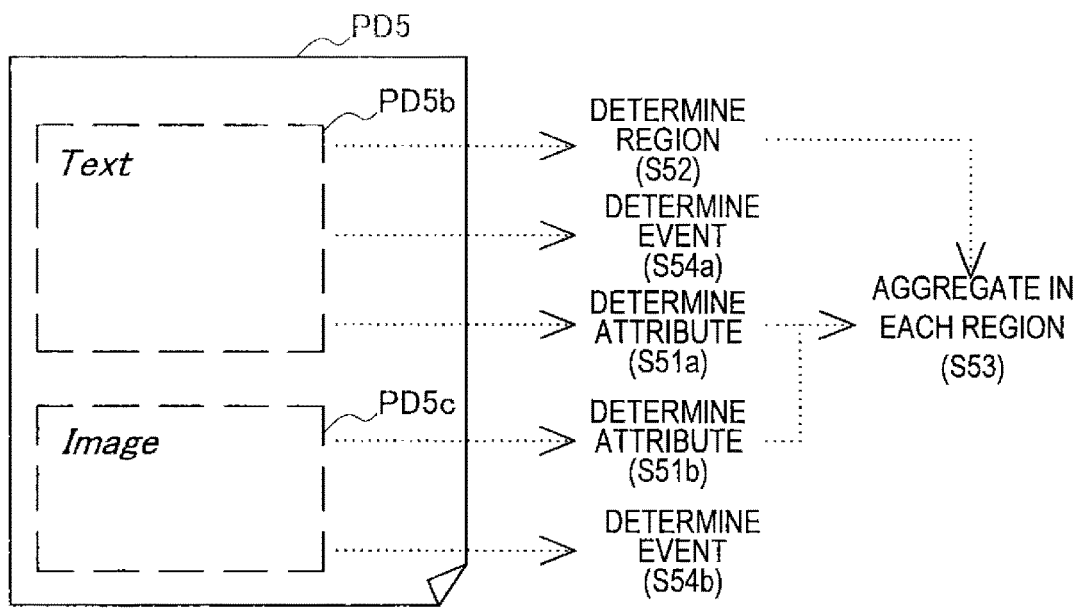

[Fig. 21A]
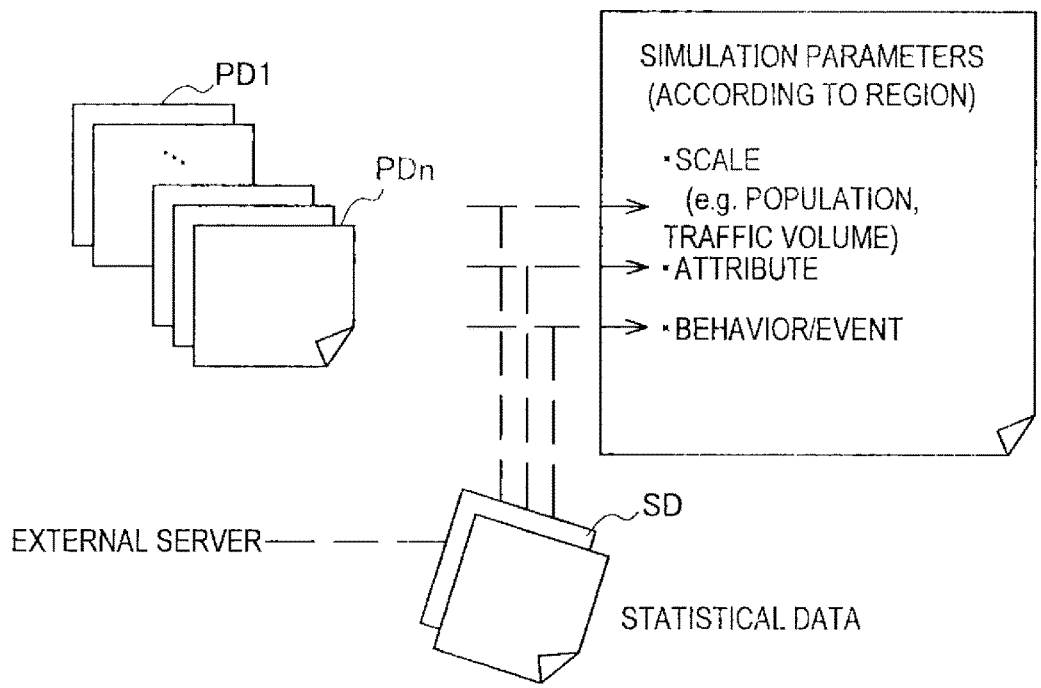
[Fig. 21B]
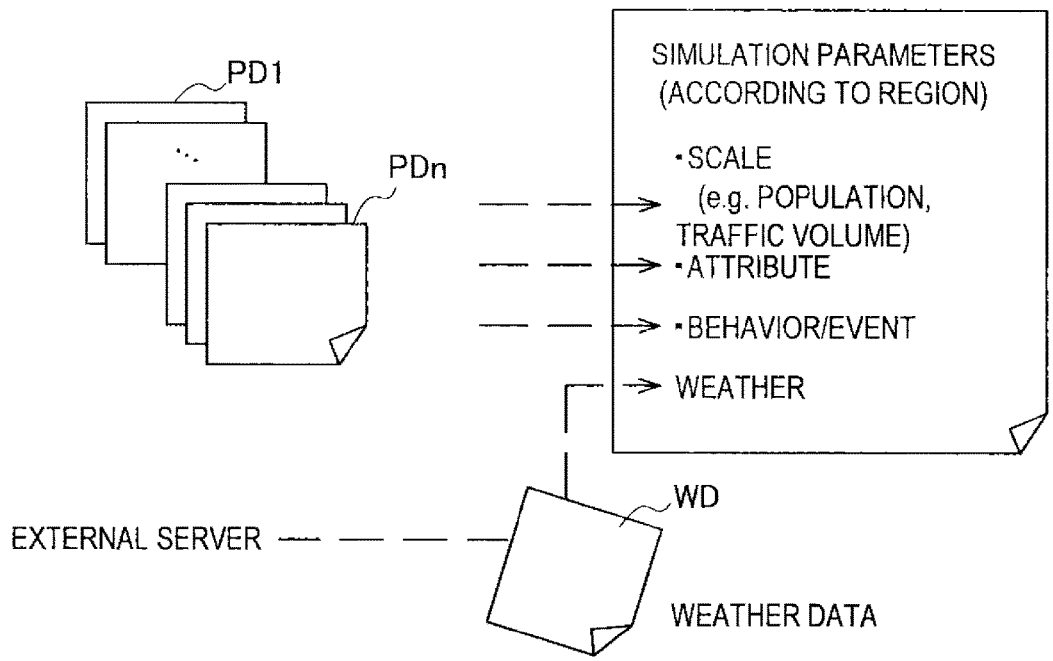

[Fig. 22]
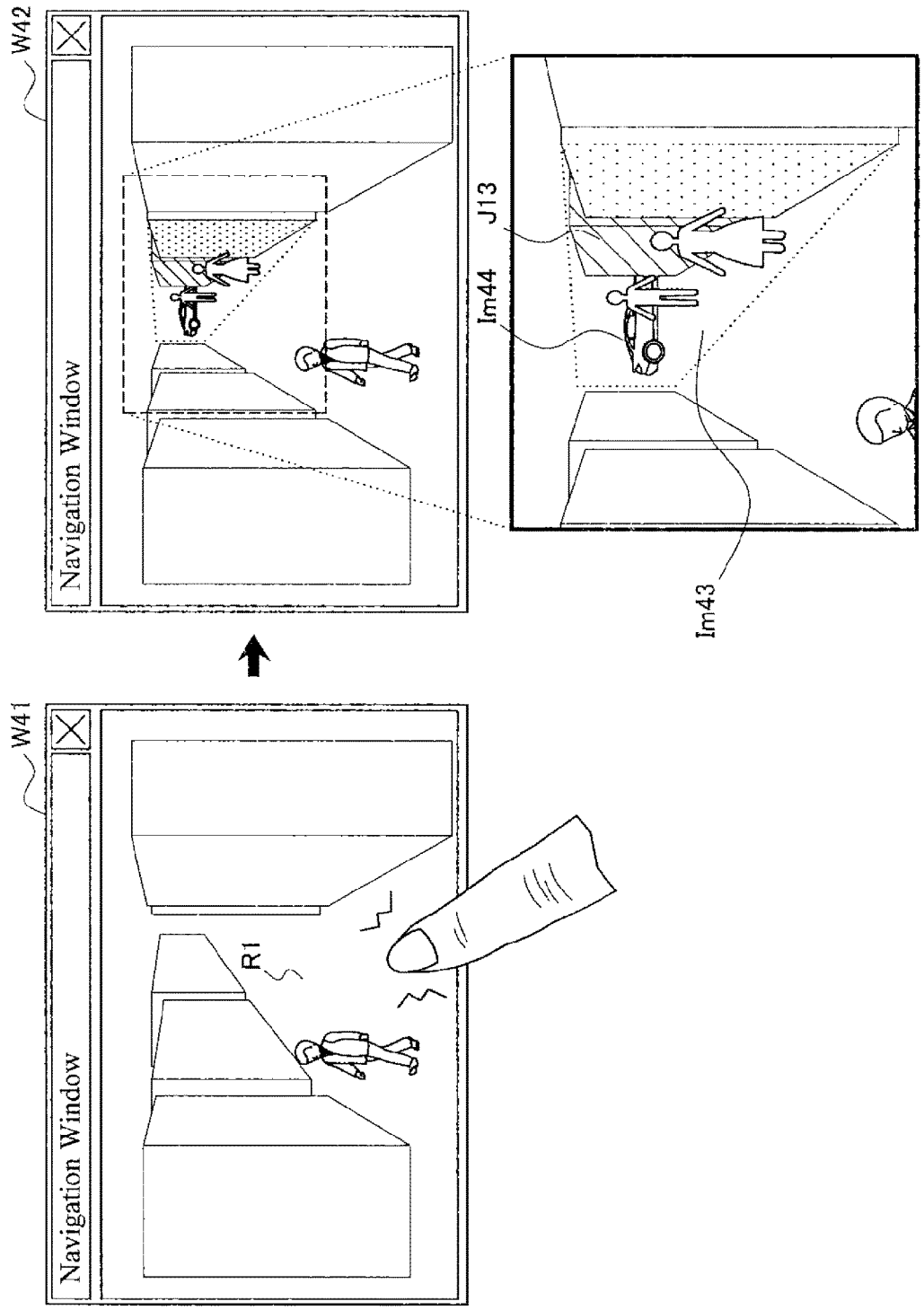

IMAGE PROCESSING DEVICE, IMAGE PROCESSING METHOD, AND TERMINAL DEVICE FOR DISTORTING AN ACQUIRED IMAGE

CROSS REFERENCE TO PRIOR APPLICATION

This application is a National Stage Patent Application of PCT International Patent Application No. PCT/JP2013/006339 (filed on Oct. 25, 2013) under 35 U.S.C. §371, which claims priority to Japanese Patent Application No. 2012-258399 (filed on Nov. 27, 2012), which are all hereby incorporated by reference in their entirety.

TECHNICAL FIELD

The present disclosure relates to an image processing device, an image processing method, a program, and a terminal device.

BACKGROUND ART

In the past, various geographic information services that present to a user geographic information in the real world on a computer screen have been put into practical use. For example, through the use of common map retrieval services opened to the public on the Web, a user can easily obtain a map of a region including locations corresponding to desired place-names, addresses, or names of landmarks, etc. On any maps displayed in map retrieval services, it is also possible to place a mark on each facility that complies with the keyword designated by a user.

Further, recent dramatic advances in computer performance have enabled user terminals to process not only 2-dimensional planar maps but also information regarding 3-dimensional spaces. For example, the following PTL1 discloses a method of partially processing an input image and displaying a target object such as a building or a facility in a 3-dimensional space shown in the input image in an emphatic manner so that the target object can be easily found in the real world.

CITATION LIST

Patent Literature

PTL 1: JP 2010-224347A

SUMMARY

Technical Problem

In the method of displaying the target object shown in the input image in the emphatic manner, however, there is no advantageous effect when the target object is not shown from a viewpoint of a camera. Information regarding what objects are located at locations that are not directly visible from the viewpoint at that time is also important for a user. The user may obtain such information when the user views a map. However, since a viewpoint from which the map is drawn is different from the viewpoint of the user (or the camera) in the real world, it may be difficult to match information on the map with objects in the real world in some cases.

Accordingly, it is desirable to provide a new configuration in which information regarding a place that is not directly visible from a viewpoint of a user can be presented to the user, while easy understanding of an image from the viewpoint can be obtained.

Solution to Problem

According to an exemplary embodiment, the disclosure is directed to an information processing system that acquires image data; distorts the acquired image data according to a predetermined distortion criterion; acquires an object image corresponding to an object that is at least partially obstructed in the acquired image; combines the object image with the distorted image data; and outputs the distorted image data combined with the object image.

The acquired image data may correspond to a real world image captured by an image capture device.

The information processing system may be configured to store a model indicating a position of the object present in the real world.

The acquired image data may correspond to a real world image captured by an image capture device, and the information processing system may be configured to detect characteristic points from the acquired image data; determine a position and posture of the information processing system based on data output from a sensor unit; and extract characteristic point data regarding the object from the model.

According to another exemplary embodiment, the disclosure is directed to a method performed by an information processing system, the method including: acquiring an image; distorting the acquired image according to a predetermined distortion criterion; acquiring an object image corresponding to an object that is at least partially obstructed in the acquired image data; combining the object image with the distorted image; and outputting the distorted image combined with the object image.

According to another exemplary embodiment, the disclosure is directed to a non-transitory computer-readable medium including computer program instructions, which when executed by an information processing system, cause the information processing system to: acquire an image; distort the acquired image according to a predetermined distortion criterion; acquire an object image corresponding to an object that is at least partially obstructed in the acquired image data; combine the object image with the distorted image; and output the distorted image combined with the object image.

Advantageous Effects of Invention

According to the technology of the present disclosure, information regarding a place that is not directly visible from a viewpoint of a user can be presented to the user, while easy understanding of an image from the viewpoint can be obtained.

BRIEF DESCRIPTION OF DRAWINGS

FIG. 1A is a first explanatory diagram illustrating an overview of a device.

FIG. 1B is a second explanatory diagram illustrating an overview of a device.

FIG. 2 is a block diagram illustrating an example of a hardware configuration of an image processing device according to a first embodiment.

FIG. 3 is a block diagram illustrating an example of a logic functional configuration of the image processing device according to the first embodiment.

FIG. 4 is a rough explanatory diagram of an example of a processing scenario.

FIG. 5A is an explanatory diagram exemplifying a first situation in which there is an object which is difficult to view.

FIG. 5B is a first explanatory diagram of a distortion process which can be executed in the first situation.

FIG. 5C is a second explanatory diagram of a distortion process which can be executed in the first situation.

FIG. 5D is a third explanatory diagram of a distortion process which can be executed in the first situation.

FIG. 5E is a fourth explanatory diagram of a distortion process which can be executed in the first situation.

FIG. 6A is an explanatory diagram exemplifying a second situation in which there is an object which is difficult to view.

FIG. 6B is a first explanatory diagram of a distortion process which can be executed in the second situation.

FIG. 6C is a second explanatory diagram of a distortion process which can be executed in the second situation.

FIG. 6D is a third explanatory diagram of a distortion process which can be executed in the second situation.

FIG. 6E is a fourth explanatory diagram of a distortion process which can be executed in the second situation.

FIG. 7A is an explanatory diagram exemplifying a third situation in which there is an object which is difficult to view.

FIG. 7B is a first explanatory diagram of a distortion process which can be executed in the third situation.

FIG. 7C is a second explanatory diagram of a distortion process which can be executed in the third situation.

FIG. 7D is a third explanatory diagram of a distortion process which can be executed in the third situation.

FIG. 7E is a fourth explanatory diagram of a distortion process which can be executed in the third situation.

FIG. 8 is an explanatory diagram of another example of the distorted image.

FIG. 9A is a first explanatory diagram of a first example of a user interface used to distort an image.

FIG. 9B is a second explanatory diagram of the first example of a user interface used to distort an image.

FIG. 10A is a first explanatory diagram of a second example of a user interface used to distort an image.

FIG. 10B is a second explanatory diagram the second example of a user interface used to distort an image.

FIG. 11 is an explanatory diagram of a third example of a user interface used to distort an image.

FIG. 12 is a flowchart illustrating an example of a flow of image processing according to the first embodiment.

FIG. 13 is a block diagram illustrating an example of a logic functional configuration of an image processing device according to a second embodiment.

FIG. 14 is an explanatory diagram of an example of a character model,

FIG. 15 is an explanatory diagram of an example of a vehicle.

FIG. 16A is an explanatory diagram of a first example of a simulation result.

FIG. 16B is an explanatory diagram of a second example of a simulation result.

FIG. 16C is an explanatory diagram of a third example of a simulation result.

FIG. 17 is an explanatory diagram of examples of behaviors of the character models.

FIG. 18 is an explanatory diagram of an example of an event.

FIG. 19 is an explanatory diagram of a first method of determining simulation parameters.

FIG. 20A is an explanatory diagram of a first example of analysis of posting data.

FIG. 20B is an explanatory diagram of a second example of analysis of posting data.

FIG. 20C is an explanatory diagram of a third example of analysis of posting data.

FIG. 20D is an explanatory diagram of a fourth example of analysis of posting data.

FIG. 20E is an explanatory diagram of a fifth example of analysis of posting data.

FIG. 21A is an explanatory diagram of a second method of determining simulation parameters.

FIG. 21B is an explanatory diagram of a third method of determining simulation parameters.

FIG. 22 is an explanatory diagram of an example of a distorted image which can be displayed in the second embodiment.

DESCRIPTION OF EMBODIMENTS

Hereinafter, preferred embodiments of the present disclosure will be described in detail with reference to the appended drawings. Throughout the specification and the drawings, the same reference numerals are given to constituent elements having substantially the same functional configuration, and the repeated description will be omitted.

The description will be made in the following order.
1. Overview of device
2. First embodiment
2-1. Hardware configuration
2-2. Example of functional configuration
2-3. Specific processing scenario
2-4. Example of user interface
2-5. Flow of process
2-6. Summarization of first embodiment
3. Second embodiment
3-1. Example of functional configuration
3-2. Details of simulation
3-3. Determination of simulation parameters
3-4. Example of object image
3-5. Summarization of second embodiment 1. Overview of Device First, an overview of an imaging apparatus device according to an embodiment will be described with reference to FIGS. 1A and 1B.

FIG. 1A is a first explanatory diagram illustrating the overview of an image processing device 100 according to the embodiment. Referring to FIG. 1A, the image processing device 100 which a user Ua has is illustrated. The image processing device 100 includes a camera 101 oriented toward the real world 1 and a display 111. In the example of FIG. 1A, various objects such as a building 3 and a road 5 are present in the real world 1. The building 3 and the road 5 are shown in an image Im01 captured by the camera 101. As an example, the image processing device 100 has a navigation function. The navigation function superimposes navigation information (for example, an arrow in the drawing) on the road 5 in the image Im01. Further, the display 111 displays the image Im01 on which the navigation information is superimposed.

In FIG. 1A, a smartphone is illustrated as an example of the image processing device 100. However, the image processing device 100 is not limited to this example. The image processing device 100 may be, for example, a personal computer (PC), a personal digital assistant (PDA), a game terminal, or a portable navigation device (PND).

FIG. 1B is a second explanatory diagram illustrating an image processing device 100 according to an embodiment. In the example of FIG. 1B, the image processing device 100 is a wearable device having a shape of head-mounted glasses. The image processing device 100 includes a camera 101, an input device 109, and a display 111. The camera 101 is disposed so that the optical axis of its lens is substantially parallel to a visual line of a user Ub, and captures an image. The input device 109 includes a contact surface disposed on a chassis and detects a touch performed by the user Ub. The display 111 is disposed on the front side of the left and right eyes of the user Ub and includes a see-through type or non-see-through type screen.

In either case of FIGS. 1A and 1B, the user can view a form of the real world through the display 111. In the example of FIG. 1A, however, since an object present at the tip of the road 5 turning left on the front side is covered by the building 3, the object is not visible to the user Ua and is not shown in a captured image either. When such an object is a landmark important to navigation, the fact that the object is not visible is inconvenient to the user. In addition to such a situation, there are many situations in which important objects of the real world are not visible to users, for example, at spots at which roads change from an ascending slope to a descending slope or spots at which the widths of roads are narrow.

Accordingly, in embodiments to be described below, the image processing device 100 presents a user with information regarding a place that is not directly visible by distorting the real world shown in an image, while maintaining easy understanding of an image from a viewpoint of the user.

In the following description, the image processing device 100 is assumed to operate as a standalone device to facilitate the description. However, various functions to be described may be realized by associating a terminal device with a server device.

2. First Embodiment

<2-1. Hardware Configuration>

FIG. 2 is a block diagram illustrating an example or a hardware configuration of the image processing device 100 according to a first embodiment. Referring to FIG. 2, the image processing device 100 includes a camera 101, a positioning sensor 103, an electronic compass 105, an acceleration sensor 107, an input device 109, a display 111, a communication interface (I/F) 113, a memory 115, a bus 117, and a processor 119.

The camera 101 includes, for example, an image element of a charge coupled device (CCD), a complementary metal oxide semiconductor (CMOS), or the like and captures an image. The positioning sensor 103 receives a GPS signal from a Global Positioning System (GPS) satellite or a wireless signal from a wireless access point and measures a current position of the image processing device 100. The electronic compass 105 detects a bearing to which the image processing device 100 is currently oriented. The acceleration sensor 107 detects an acceleration generated by a force added to the image processing device 100.

The input device 109 may include a touch sensor, a button, a switch, a keypad, or a pointing device used for a user to operate the image processing device 100 or to input information to the image processing device 100. When the image processing device 100 is a wearable device as exemplified in FIG. 1B, the input device 109 may include a visual line detection module that detects a visual line of the user. The display 111 includes a screen formed by a liquid crystal display (LCD), an organic light emitting diode (OLED), or the like and displays an image. The communication I/F 113 supports any wireless communication protocol or any wired communication protocol and establishes communication connection between the image processing device 100 and another device.

The memory 115 is a semiconductor memory that may include a random access memory (RAM) and a read-only memory (ROM) and stores a program and data for a process performed by the image processing device 100. The bus 117 connects the camera 101, the positioning sensor 103, the electronic compass 105, the acceleration sensor 107, the input device 109, the display 111, the communication I/F 113, the memory 115, and the processor 119 to each other. The processor 119 is, for example, a central processing unit (CPU) or a digital signal processor (DSP) and operates various functions of the image processing device 100 to be described below by executing programs stored in the memory 115 or another storage medium.

<2-2. Example of Functional Configuration>

FIG. 3 is a block diagram illustrating an example of a logic functional configuration realized by the memory 115 and the processor 119 of the image processing device 100 illustrated in FIG. 2. Referring to FIG. 3, the image processing device 100 includes an image acquisition unit 120, a model database (DB) 130, an image processing unit 140, an object image generation unit 150, a user interface unit 160, and a navigation unit 170.

(1) Image Acquisition Unit

The image acquisition unit 120 acquires an input image which is captured by the camera 101 and shows the real world. The input image acquired by the image acquisition unit 120 may be a still image or each of a series of frames forming a moving image. The image acquisition unit 120 outputs the acquired input image to the image processing unit 140 and the user interface unit 160.

(2) Model DB

The model DB 130 is a database that stores in advance a real world model expressing a position of an object present in the real world. For example, the real world model can express positions of various objects such as buildings, roads, signboards, benches, and roadside trees in the real world using 2-dimensional or 3-dimensional coordinate values (latitude, longitude, and altitude). Typically, in the real world model, each object includes a plurality of characteristic points, and thus a 3-dimensional shape of each object is expressed by positions of the characteristic points. A texture of the surface of an object may be further expressed by the real world model.

(3) Image Processing Unit

The image processing unit 140 distorts the input image input from the image acquisition unit 120 according to a distortion criterion and generates a distorted image. The distortion process performed by the image processing unit 140 is a process that is performed to show a place that is not directly visible from a viewpoint of the user (to facilitate easy viewing of a place which is hard to view), while easy understanding of the input image from the viewpoint of the user is maintained. For example, the image processing unit 140 can use the following three kinds of distortion criteria:

Distortion criterion A—curvature of a road shown in the input image is changed;

Distortion criterion B—a gradient of a road shown in the input image is changed; and Distortion criterion B—a building shown in the input image is erased.

As an example, the distortion criterion A can be selected to show an object ahead on a road by decreasing curvature of the road or straightening the road. The distortion criterion B can be selected to show an object at the tip of a road by elevation of a downgrade portion of the road at a point at which the road changes from an upgrade to a downgrade. The distortion criterion C can be selected to show a rear building hidden due to the presence of a front building. These distortion criteria are merely examples. For example, other distortion criteria may be used to broaden the width of a road or enlarge a building hidden behind another.

More specifically, the image processing unit 140 detects characteristic points in an input image according to, for example, a corner detection method of the related art, such as the Harris method or the Moravec method. The image processing unit 140 determines a position and a posture of the image processing device 100 based on sensor data input from the positioning sensor 103, the electronic compass 105, and the acceleration sensor 107 and extracts characteristic point data regarding an object entering an angle of view of the camera 101 from the real world model. Next, the image processing unit 140 matches the characteristic points detected in the input image with the characteristic point data extracted from the real world model. As a result, the image processing unit 140 recognizes what object is shown and where the object is shown in the input image. Next, the image processing unit 140 moves the positions of the matched characteristic points according to a selected distortion criterion. For example, when curvature of a road changes, the positions of the characteristic points can be moved to be rotated within a horizontal plane of a model space only at an angle corresponding to the amount of change in curvature using a criterion point of an end portion of the road as a center. When a gradient of a road changes, the positions of the characteristic points can be moved to be rotated within the vertical plane of the model space only at an angle corresponding to the amount of change in gradient. When a building is erased, a surface surrounded by designated characteristic points of the building can be erased from the input image.

As a result of the distortion, a blank portion may be produced in the distorted image. The blank portion is a portion in which an object that was hidden in the original input image should be shown. Since the input image has no texture of the hidden object, the image processing unit 140 supplements the texture of the blank portion with an object image generated as a supplement. The object image is generated by the object image generation unit 150 to be described below.

(4) Object Image Generation Unit

The object image generation unit 150 generates an object image corresponding to an object which should be located in a blank portion using the real world model when the blank portion is produced in the distorted image as the distortion result obtained by the image processing unit 140. As a first method, the object image may be an image which should occupy the blank portion when the real world is distorted according to a selected distortion criterion. As a second method, the object image may be an icon image corresponding to an object which should be located in the blank portion.

In the first method, an object included in the real world model is distorted according to a selected distortion criterion, irrespective of whether the object is shown in an input image. The characteristic points of the object are moved through the distortion. As a result, the object hidden from the viewpoint of the camera 101 by another object has a line of sight to the viewpoint of the camera 101. The object image generation unit 150 generates an object image based on the positions of the characteristic points and a texture of the object of the real world model distorted in this way using the viewpoint of the camera 101 as a criterion.

An object included in the real world model is distorted according to a selected distortion criterion in the second method as well. The object image generation unit 150 determines an object that newly has a line of sight to the viewpoint of the camera 101 based on the positions of the characteristic points of the distorted real world model. Then, the object image generation unit 150 generates an icon image corresponding to the determined object as an object image.

The object image generation unit 150 outputs the generated object image to the image processing unit 140. The image processing unit 140 overlays the object image generated by the object image generation unit 150 onto a blank portion of the distorted image. Then, the image processing unit 140 outputs the overlaid distorted image to the user interface unit 160.

(5) User Interface Unit

The user interface unit 160 supplies a user interface to the user of the image processing device 100 via the input device 109 and the display 111 illustrated in FIG. 2. For example, in a normal display mode, the user interface unit 160 outputs an input image input from the image acquisition unit 120 as an output image to the display 111 without distortion and causes the display 111 to display the output image on a screen. In a distortion display mode, the user interface unit 160 outputs the distorted image input from the image processing unit 140 as an output image to the display 111 and causes the display 111 to display the output image on a screen.

The user interface unit 160 may also supply a user interface used for the user to switch between the normal display mode and the distortion display mode. The user interface unit 160 may supply a user interface used for the user to designate an object which is to be designated as a distortion target. The switch between the two modes and the designation of an object may be performed according to any input from a user such as tap on a screen, press of a button, input of a key, or detection of a predetermined sound command.

When the image processing device 100 is the wearable device as exemplified in FIG. 1B, the switch between the two modes and the designation of an object may be performed based on a result of visual line detection performed by a visual line detection module detecting a visual line of the user. For example, when it is detected that the user views the same road for a predetermined period, a curvature or a gradient of the road may be changed.

The user interface unit 160 may supply a user interface used for the user to designate a distortion criterion for distortion of an input image from a plurality of applicable criteria. For example, the user interface unit 160 may superimpose a list of the applicable criteria among the above-described distortion criteria A, B, and C on the input image, so that the user can select one of the distortion criteria.

(6) Navigation Unit

The navigation unit 170 is a functional block on which a navigation function is mounted. For example, when one of the objects included in the real world model is designated as a destination location by the user, the navigation unit 170 sets an optimum route from a current location to a destination location and supplies the user with navigation along the set route. For example, the navigation unit 170 may output navigation information such as an arrow as exemplified in FIG. 1A to the image processing unit 140 and superimpose the navigation information onto the input image or the distorted image. The image processing unit 140 may set a road on a route up to a destination location set by the navigation unit 170 as a distortion target in the distortion display mode and automatically select the road.

The above-described distorted image may be used for uses other than the navigation. For example, a distorted image may be presented to the user in the distortion display mode to support tasks such as design of an architectural structure, planning of road construction, and formulation of a city plan. In this case, the navigation unit 170 may be omitted from the configuration of the image processing device 100.

<2-3. Specific Processing Scenario>

Next, examples of specific processing scenarios performed by the image processing device 100 are illustrated in FIGS. 4 to 8.

(1) Overview of Processing Scenario

FIG. 4 is a rough explanatory diagram of an example of the processing scenario to be described in this section. Referring to FIG. 4, a partial bird's-eye view of a real world model RM from a viewpoint in the sky is illustrated. In the drawing, a mark with a human shape indicates a current location of the user and a mark with a star shape indicates a destination location of navigation. A dashed line binding the current location with the destination location is a route set by the navigation unit 170. As understood from the drawing, the set route turns right on a corner on which a landmark M1 is located, and then turns left on a corner on which a landmark M2 is located. The destination location is a building M3. In the specification, the term landmark means any object that serves as a mark when the user recognizes a route. The landmark may not necessarily be an object more noticeable than other objects.

(2) First Situation

FIG. 5A is an explanatory diagram exemplifying a first situation in which there is an object which is difficult to view. Referring to FIG. 5A, an input image Im11 which can be captured when the user orients a camera in a traveling direction (north) of the route at a position P1 of the real world model RM illustrated in FIG. 4 is illustrated. A road R1 and buildings J11, J12, J14, J15, and J16 standing side by side along the road R1 are shown in the input image Im11. However, since the road R1 is curved to the right side in the image, the building J13 located at the tip of the road R1 is hidden by the buildings J11 and J12, and thus is not visible. Since the building J13 corresponds to the landmark M1 in FIG. 4, the fact that the building J13 is not visible is inconvenient to the user.

FIGS. 5B to 5E are explanatory diagrams of a distortion process which can be performed in the first situation illustrated in FIG. 5A.

First, referring to FIG. 5B, a plurality of visible characteristic points detectable in the input image Im11 are indicated by small diamond marks and hidden characteristic points are indicated by triangular marks. The image processing unit 140 matches the characteristic points detected in the input image Im11 with characteristic points included in the real world model and recognizes that the building J13 is hidden due to the fact that the road R1 is curved. Then, when the distortion criterion A in which a curvature of the road R1 is changed is selected, the image processing unit 140 moves the positions of the characteristic points so that the road R1 becomes closer to a straight line.

Referring to FIG. 5C, a form in which the road R1 is distorted to a straight-line shape in a distorted image Im12 and thus the characteristic points in the periphery of the road R1 are moved is illustrated. However, the distorted image Im12 includes a blank portion B1. The blank portion B1 is a portion which is not shown in the input image Im11 due to the curvature of the road R1.

Referring to FIG. 5D, an object image Im13 occupying the blank portion B1 in a rectangular image frame corresponding to the distorted image Im12 is illustrated. The object image Im13 includes the characteristic points and textures of the buildings J12 and J13 having a line of sight to the viewpoint of the camera 101 as a distortion result.

The image processing unit 140 overlays the object image Im13 illustrated in FIG. 5D onto the distorted image Im12 illustrated in FIG. 5C to generate a distorted image Im14 illustrated in FIG. 5E. In the distorted image Im14, the blank portion is supplemented with the object image Im13, and as a consequence, the building J13 corresponding to the landmark M1 becomes visible.

The user can visually understand that the landmark M1 is present at the tip of the road R1 and how far the user should move to arrive at the landmark M1 by referring to the distorted image Im14 in the distortion display mode.

(3) Second Situation

FIG. 6A is an explanatory diagram exemplifying a second situation in which there is an object which is difficult to view. Referring to FIG. 6A, an input image Im21 which can be captured when the user orients a camera in a traveling direction (east) of the route at a position P2 of the real world model RM illustrated in FIG. 4 is illustrated. A road R2 and buildings J21, J22, J23, 124, and J25 standing side by side along the road R2 are shown in the input image Im21. However, since the road R2 in front changes from an upgrade to a downgrade, although the building J23 located at the tip of the road R2 is partially visible, it is difficult to view. Since the building J23 corresponds to the landmark M2 in FIG. 4, the fact that the building J23 is difficult to view is inconvenient to the user.

FIGS. 6B to 6E are explanatory diagrams of a distortion process which can be performed in the second situation illustrated in FIG. 6A.

First, referring to FIG. 6B, a plurality of visible characteristic points detectable in the input image Im21 are indicated by small diamond marks and hidden characteristic points are indicated by triangular marks. The image processing unit 140 matches the characteristic points detected in the input image Im21 with characteristic points included in the real world model and recognizes that the building J23 is hidden due to the fact that the gradient of the road R2 changes. Then, when the distortion criterion B in which a gradient of the road R2 is changed is selected, the image processing unit 140 moves the positions of the characteristic points so that a portion of the downgrade of the road R2 is elevated.

Referring to FIG. 6C, a form in which the portion of the downgrade of the road R2 is elevated in a distorted image Im22 and thus the characteristic points in the periphery of the road R2 are moved is illustrated. However, the distorted image Im22 includes a blank portion B2. The blank portion B2 is a portion which is not shown in the input image Im21 due to the gradient of the road R2.

Referring to FIG. 6D, an object image Im23 occupying the blank portion B2 in a rectangular image frame corresponding to the distorted image Im22 is illustrated. The object image Im23 includes the characteristic points and texture of the building J23 having a line of sight to the viewpoint of the camera 101 as a distortion result.

The image processing unit 140 overlays the object image Im23 illustrated in FIG. 6D onto the distorted image Im22 illustrated in FIG. 6C to generate a distorted image Im24 illustrated in FIG. 6E. In the distorted image Im24, the blank portion is supplemented with the object image Im23, and as a consequence, the building J23 corresponding to the landmark M2 can be viewed more easily.

The user can more clearly understand that the landmark M2 is present at the tip of the road R2 and how far the user should move to arrive at the landmark M2 by referring to the distorted image Im24 in the distortion display mode.

(4) Third Situation

FIG. 7A is an explanatory diagram exemplifying a third situation in which there is an object which is difficult to view. Referring to FIG. 7A, an input image Im31 which can be captured when the user orients a camera in a traveling direction (north) of the route at a position P3 of the real world model RM illustrated in FIG. 4 is illustrated. Buildings J31, J33, and J34 are shown in the input image Im31. However, since the building J32 corresponding to the destination location M3 is hidden by the building J31, the building J32 is not visible. The fact that the building J32 is not visible is inconvenient to the user.

FIGS. 7B to 7E are explanatory diagrams of a distortion process which can be performed in the third situation illustrated in FIG. 7A.

First, referring to FIG. 7B, a plurality of visible characteristic points detectable in the input image Im31 are indicated by small diamond marks and hidden characteristic points are indicated by triangular marks. The image processing unit 140 matches the characteristic points detected in the input image Im31 with characteristic points included in the real world model and recognizes that the building J32 is hidden. Then, when the distortion criterion C in which a building is erased is selected, the image processing unit 140 erases from the input image Im31 a texture of the building J31 which can be designated.

Referring to FIG. 7C, a form in which the texture of the building J31 is erased in a distorted image Im32 is illustrated. The distorted image Im32 includes a blank portion B3. The blank portion B3 is a portion in which the erased building was shown.

Referring to FIG. 7D, an object image Im33 occupying the blank portion B3 in a rectangular image frame corresponding to the distorted image Im32 is illustrated. The object image Im33 includes the characteristic points and texture of the building J32 having a line of sight to the viewpoint of the camera 101 as a distortion result.

The image processing unit 140 overlays the object image Im33 illustrated in FIG. 7D onto the distorted image Im32 illustrated in FIG. 7C to generate a distorted image Im34 illustrated in FIG. 7E. In the distorted image Im34, the blank portion is supplemented with the object image Im33, and as a consequence, the building J32 corresponding to the destination location M3 can be viewed.

The user can visually understand that the building J32 which is the destination location is behind the building in front of him or her by referring to the distorted image Im34 in the distortion display mode.

The image processing unit 140 may allow the user to view a landmark by expanding the size of the landmark in the real world model instead of erasing another object.

The various distortion methods described in this section are not limited to the destination location and the landmark, but may be used so that the user can view any object.

(5) Another Example of Distortion Image

As described above, the object image may be an icon image corresponding to an object which is not visible or difficult to view. FIG. 8 is an explanatory diagram of an example of a distorted image in which the object image is overlaid.

Referring to FIG. 4, in the first situation illustrated in FIG. 5A, a distorted image Im15 which can be displayed in the distortion display mode is illustrated instead of the distorted image Im14 illustrated in FIG. 5E. The distorted image Im15 includes an icon image IC1 disposed in the blank portion B1. The icon image IC1 indicates that the building J13 such as a hospital is located at the tip of the road R1 as a landmark. The user can exactly understand that the landmark is located at the tip of the road R1 by referring to the distorted image Im15.

<2-4. Example of User Interface>

Next, examples of user interfaces supplied by the image processing device 100 are illustrated in FIGS. 9A to 11.

(1) First Example

FIGS. 9A and 9B are explanatory diagrams of a first example of a user interface used to distort an image.

Referring to FIG. 9A, a navigation window W11 displaying an input image in a normal display mode is illustrated. For example, when the user taps the navigation window W11, a navigation window W12 on which a menu MN1 is superimposed is displayed. The menu MN1 includes a list of distortion criteria applicable to the input image. In the example of FIG. 9A, the list includes distortion criterion A ("Make Road Straight") set to straighten a road, distortion criterion B ("Lift Up Road") set to elevate a road, and distortion criterion C ("Erase Building") set to erase a building as menu items.

For example, when the user taps the distortion criterion A of the menu MN1, as illustrated in FIG. 9B, the navigation window W13 is displayed. The navigation window W13 is a window used for the user to designate a road to be distorted. Here, when the user taps the road R1, the display mode transitions to the distortion display mode and a navigation window W14 displaying the road R1 distorted to a straight-line shape is displayed. For example, when the user taps the window again, the display mode may return to the normal display mode.

(2) Second Example

FIGS. 10A and 10B are explanatory diagrams of a second example of a user interface used to distort an image.

Referring to FIG. 10A, the navigation window W21 displaying an input image in t e normal display mode is illustrated. For example, when the user orients the image processing device 100 toward a bearing along a navigation route (or a visual line of the user is oriented toward the bearing) and a predetermined time T1 elapses, a navigation window W22 on which a menu MN2 is superimposed is displayed. The menu MN2 includes a list of distortion criteria applicable to the input image. In the example of FIG. 10A, the list includes the distortion criterion B ("Lift Up Road") set to elevate a road and the distortion criterion C ("Erase Building") set to erase a building as menu items.

For example, when the user taps the distortion criterion B of the menu MN2, illustrated in FIG. 10B, the navigation window W23 is displayed. On the navigation window W23, the road R2 is automatically selected as a distortion target and the gradient of the road R2 is changed. Further, an icon IC2 indicating that the display mode at this time point is the distortion display mode is displayed. On a navigation window W24, the gradient of the road R2 returns to the original gradient and an icon IC3 indicating that the display mode at this time point is the normal display mode is displayed. The transition between the distortion display mode and the normal display mode may be performed using any event as a trigger. The event may be, for example, any input from a user, a change in a visual line, a change in the posture of the image processing device 100, lapse of a predetermined time, or movement of the user.

(3) Third Example

FIG. 11 is an explanatory diagram of a third example of the user interface used to distort an image. Referring to FIG. 11, a route map window W3 showing a bird's-eye view of the real world model RM from a viewpoint in the sky is illustrated. When the user drags the route displayed on the route map window W3 to trace the route with his or her finger on the window, for example, the window transitions to the navigation window W14 illustrated in FIG. 9B and the distorted image is displayed in the distortion display mode.

<2-5. Flow of Process>

FIG. 12 is a flowchart illustrating an example of a flow of image processing which can be performed by the image processing device 100 according to this embodiment. The process illustrated in FIG. 12 can be performed for every frame imaged in the distortion display mode.

Referring to FIG. 12, first, the image acquisition unit 120 acquires an input image captured by the camera 101 (step S102). Then, the image acquisition unit 120 outputs the acquired input image to the image processing unit 140 and the user interface unit 160.

Next, the image processing unit 140 determines a distortion criterion and a distortion target automatically or according to a user's input detected via the user interface unit 160 (step S104). The user interface used here may be, for example, any user interface described with reference to FIGS. 9A to 11.

Next, the image processing unit 140 distorts the input image using a real world model acquired from the model DB 130 according to the determined distortion criterion to generate a distorted image (step S106). The subsequent processes of step S110 and S112 are skipped when there is no blank portion in the distorted image (step S108).

The object image generation unit 150 generates an object image corresponding to an object located in the blank portion produced in the distorted image as the result of the distortion performed by the image processing unit 140 using the real world model (step S110). Next, the image processing unit 140 overlays the generated object image onto the blank portion of the distorted image (step S112).

Then, the image processing unit 140 outputs the distorted image (or the distorted image generated in step S106 when there is no blank portion) in which the object image is overlaid to the user interface unit 160 (step S114). Thus, the distorted image is displayed on a screen of the display 111.

<2-6. Summarization of First Embodiment>

The first embodiment of the technology according to the present disclosure has been described in detail above with reference to FIGS. 2 to 12. According to this embodiment, a distorted image is generated by distorting an input image of the real word according to a certain distortion criterion. When a blank portion is produced in the distorted image, the object image generated using a real world model defined in advance is overlaid onto the blank portion of the distorted image. That is, since an image of an object visible from the viewpoint of a user is supplemented in the distorted image through the distortion, information regarding a place which is difficult to view directly before the distortion can be presented to the user.

The object image is an image which is to occupy the blank portion when the real world distorted virtually according to a selected distortion criterion is visible from the viewpoint of the user (camera). Accordingly, the distorted image in which the object image is overlaid is also displayed as a natural image from the viewpoint of the user. Therefore, easy understanding is not lost compared to a case in which an image (for example, a map from an overlook viewpoint) from another viewpoint is displayed, so that a situation of the real world can be understood.

According to a certain distortion criterion, an input image is distorted so that a curvature or a gradient of a road shown in the input image is changed. Accordingly, by presenting the distorted image to the user, the position of an object hidden by another object due to the curvature or the gradient of the road can be conveyed to the user so that the user can easily understand the position of the object. According to another distortion criterion, an object hiding another object in the input image is erased, and thus the hidden object is shown as a distorted image. In this case, by presenting the distorted image to the user, the position of an object hidden by another object can easily be conveyed to the user. For example, in a navigation use, by displaying landmarks important for the navigation in distorted images, the user can understand a route up to a destination location more intuitively and easily.

In this embodiment, various UIs such as a UI configured such that the user can designate the distortion criteria, a UI configured such that the user designates a distortion target, and a UI configured such that the mode is switched between the normal display mode and the distortion display mode are provided. Accordingly, the user can distort the input image at a desired timing on the His, as the user desires, and thus the user can view an object that is not shown directly from the viewpoint at that time on the screen.

As described above, various functions of the image processing device 100 may be realized by associating a terminal device with a server device. The terminal device typically includes a communication I/F that establishes communication connection with the server device, an input device that receives a user's input, a display device that includes a screen, a memory that stores a program and data, and a processor that operates a function of the terminal device by executing the program. The processor of the terminal device acquires an input image in which the real world is shown, transmits the acquired input image to the server device via the communication I/F, and displays a distorted image received from the server device on the screen of the display device. The server device distorts the input image, as in the image processing device 100, overlays the object image onto a blank portion of the distorted image, and transmits the overlaid distorted image to the terminal device. The user interfaces described with reference to FIGS. 9A to 11 can be realized by the input device and the display device of the terminal device. A distorted image display function of the terminal device may be an application function that operates on a terminal such as a PC or a smartphone.

3. Second Embodiment

In the first embodiment, the object image overlaid onto the distortion image includes only a static object defined in advance in the real world model. On the other hand, in a second embodiment to be described below, an object image also includes a dynamic object, a location of which is estimated using dynamically collected position-associated data. Examples of the dynamic object include a character and a vehicle. Motions of the objects are simulated based on the position-associated data.

<3-1. Example of Functional Configuration>

FIG. 13 is a block diagram illustrating an example of a logical functional configuration of an image processing device 200 according to the second embodiment. Referring to FIG. 13, the image processing device 200 includes an image acquisition unit 120, a model DB 230, an image processing unit 140, an object image generation unit 250, a user interface unit 160, a navigation unit 170, a simulation unit 280, and a data collection unit 290.

(1) Simulation Unit

The simulation unit 280 performs simulation on a crowd present in the real world. The simulation performed by the simulation unit 280 is simulation by which a situation of a street changeable according to time is virtually reproduced. The situation of the street can be reproduced by, for example, a scale, an attribute, or a behavior of the crowd. In the simulation, the crowd may be expressed by a set of characters corresponding to humans. Instead (or additionally), the crowd may be expressed by a set of vehicles that humans are assumed to have boarded. Simulation parameters of the scale, the attribute, the behavior, or the like of the crowd are determined based on the position-associated data which can be collected from an external server.

In this embodiment, the position-associated data includes posting data posted by posters in an information transmission service of a user transmission type. The information transmission service of the user transmission type can include, for example, social network services (SNS) such as Facebook (registered trademark) and Foursquare (registered trademark), a short-message posting service such as Twitter (registered trademark), and an image posting service such as Instagram. When privacy protection is necessary, identification information used to identify each poster may be deleted from the posting data. The information transmission service used in this embodiment may be a location-aware service in which posting data uploaded from a terminal of a poster is accompanied with position data or may be a service in which posting data is not accompanied with position data. Instead of the posting data (or in addition to the posting data), statistical data collected with reference to a geographic position for one or more humans may be used as the position-associated data. Examples of the statistical data include traffic volume data, average income data, and public security data.

The simulation unit 280 performs the simulation on a target region corresponding to a blank portion of a distorted image to generate a crowd image. The scale, the attribute, and the behavior of the crowd are determined for each geographic area based on the position-associated data by the object image generation unit 250, as will be described below. Then, the simulation unit 280 outputs the generated crowd image to the object image generation unit 250.

(2) Model DB

The model DB 230 stores model data used when the simulation unit 280 performs the simulation in advance in addition to the real world model stored by the model DB 130 according to the first embodiment. The model data stored by the model DB 230 can include character models and vehicle models. The character models are models imitating people forming a crowd. The vehicle models are models imitating vehicles forming a crowd. In the simulation, the character models and the vehicle models are disposed in a model space expressed by the real world model and are driven and moved, for example, by artificial intelligence (AI) of each element.

(3) Data Collection Unit

The data collection unit 290 collects the position-associated data associated with the geographic position of one or more humans. For example, the position-associated data can include posting data and statistical data collected from the external server. For example, the data collection unit 290 collects the position-associated data periodically and outputs the collected position-associated data to the object image generation unit 250.

(4) Object Image Generation Unit

As in the object image generation unit 150 according to the first embodiment, the object image generation unit 250 generates an object image corresponding to an object located in a blank portion using the real world model when the blank portion is produced in a distorted image. The object image generation unit 250 superimposes a crowd image input from the simulation unit 280 onto the object image with regard to a target region of the real world corresponding to the blank portion.

For example, the object image generation unit 250 determines the target region of the real world corresponding to the blank portion from the real world model and determines the simulation parameters based on the position-association data with regard to the determined target region. The object image generation unit 250 inputs the determined simulation parameters to the simulation unit 280 and causes the simulation unit 280 to perform the simulation on the crowd present in this target region. The target region is one of a plurality of geographic regions partitioning the real word. The geographic regions may be set by any criterion suitable for a purpose of a system, such as administrative district classes or nearest station classes.

The simulation parameters determined by the object image generation unit 250 can include the scale, the attribute, and the behavior of the crowd of each region. The scale of the crowds mean the number (population) of characters or the number (traffic volume) of vehicles disposed within the target region in the simulation. The attribute of the crowd determines classes of the characters or classes of the vehicles disposed within the target region in the simulation. For example, the attribute of the crowd includes an age distribution ratio and a sex distribution ratio. More young characters and juvenile characters are disposed in a region in which young people are abundant, and more female characters are disposed in a region in which females are abundant. The attribute of the crowd may include other parameters such as an average income and the degree of public security. The behavior of the crowd determines motions of characters and vehicles disposed in the target region in the simulation. For example, the behavior of the crowd is determined by modeling the behavior of humans located in the target region of the real world or carrying out activities relevant to the target region.

The simulation parameters may include weather and a period of time of each target region and an event occurring in the target region. Some of the simulation parameters described in the specification may be omitted or additional simulation parameters may be used. The simulation parameters determined by the object image generation unit 250 and the position-association data by which the object image generation unit 250 performs the determination will be described in detail below.

<3-2. Details of Simulation>

Next, the simulation performed by the simulation unit 280 will be described in detail with reference to FIGS. 14 to 18.

(1) Example of Model Data

FIG. 14 illustrates four examples CM1 to CM4 of character models which can be stored by the model DB 230. The character models CM1 to CM4 are characterized by different attributes and have outer appearances corresponding to the characteristics. In FIG. 14, "sex," "age," and "income" are illustrated as examples of the attributes. For example, the character model CM1 is a character that is a younger male earning a medium income and having a common appearance. A character model CM2 is a character that is an older male earning a high income and having a wealthy appearance. A character model CM3 is a character that is a younger female earning a medium income and having a common appearance. A character model CM4 is a character that is a male child having a juvenile appearance.

FIG. 15 illustrates two examples VM1 and VM2 of vehicle models which can be stored by the model DB 230. The vehicle models VM1 and VM2 are characterized by different attributes and have outer appearances corresponding to the characteristics. In FIG. 15, "sex" and "age" are illustrated as examples of the attributes. For example, the vehicle model VM1 is a sports car type automobile driven by a young person earning a high income. The vehicle model VM2 is a popular car type automobile driven by a young person earning a medium income.

(2) Example of Simulation Result

The simulation unit 280 disposes character models and vehicle models in the real world model according to the simulation parameters determined with regard to the target region by the object image generation unit 250. The number of character models to be disposed depends on an estimated population of a crowd of each region determined by the object image generation unit 250. Here, the estimated population may not be a value close to a true population in the real world. When a difference in population between regions or a temporal variation in population of the same region represents an estimated value, the purpose can be sufficiently achieved. The same also applies to the other simulation parameters. The number of vehicle models to be disposed may depend on a traffic volume determined by the object image generation unit 250 or may depend on an estimated population. A class of the character model and a class of the vehicle model to be disposed depend on the attribute of the crowd of each region determined by the object image generation unit 250.

FIG. 16A is an explanatory diagram of a first example of a simulation result. In the first example, an estimated population of a target region is greater than the populations of other regions, and a traffic volume is also large. With regard to the age distribution ratio of the target region, most people are young. With regard to the sex distribution ratio, females are abundant. The average income of the target region is higher than the average incomes of other regions. The simulation result shows that numerous characters are coming and going in a street and many vehicles are travelling in roads in a model space. A ratio of the female characters among the characters in the model space occupies relatively more of the sex distribution ratio. Half of the automobiles are expensive sports car type automobiles.

FIG. 16B is an explanatory diagram of a second example of the simulation result. In the second example, an estimated population of a target region is less than the populations of other regions, and a traffic volume is also small. With regard to the age distribution ratio of the target region, children are abundant. The average income of the target region is medium. The simulation result shows that the small number of characters including a plurality of children is present in a street in a model space.

FIG. 16C is an explanatory diagram of a third example of the simulation result. In the third example, an estimated population of a target region is medium, and a traffic volume is also small. With regard to the age distribution ratio of the target region, old people are abundant. The average income of the target region is higher than the average incomes of other regions. The simulation result shows that fewer characters than the characters of the first example and more characters than the characters of the second example are coming and going in a street, and one automobile is travelling on the road in the model space. A ratio of old people who look wealthy among the characters in the model space occupies relatively most of the age distribution ratio.

When the 3 examples illustrated in FIGS. 16A to 16C are compared, it can be understood that differences in the scale and the attribute of the crowd present in the examples express characteristics of each street. Such simulation can be performed using generally public statistical data. However, a situation of a street in the real world can change considerably over time depending on a period of time, a day, a season, holding of a certain event, or the like. Accordingly, it is difficult to say that static statistical data based on a past statistical period expresses the latest situation of a street. Accordingly, the image processing device 200 continuously collects the position-associated data and dynamically changes the simulation parameters based on the collected position-associated data, as described above.

(3) Example of Behavior of Crowd

In FIGS. 16A to 16C, the differences in the scale and the attribute of the crowd have mainly been described. However, the simulation unit 280 may cause the crowd in the model space to reproduce behaviors of people modeled for each geographic region. FIG. 17 is an explanatory diagram of examples of behaviors of character models. Referring to FIG. 17, a character model CM1*a* holding a business bag in his or her left hand is operating a cellular phone with his or her right hand. Such a behavior called "calling" may be performed by a character model disposed in a region in which business men are abundant. A character model CM1*b* is "jogging." A character model CM1*c* is "smoking." Such behaviors can also be modeled for each geographic region and can be performed by character models.

(4) Example of Event

The simulation unit 280 may reproduce an event which takes place or an event which is estimated to take place in a certain geographic region in simulation. FIG. 18 is an explanatory diagram of an example of an event which can be reproduced in simulation. Referring to FIG. 18, a building Bldg1 is illustrated in a model space. In certain simulation, a queue is formed in front of the building Bldg1. For example, when a large amount of posting data associated with a store in a specific place is collected in a short time, an event "queue" is determined to take place and the determined event can be reproduced in the simulation. The simulation unit 280 may reproduce a different kind of event such as "traffic accident" or "blooming of cherry blossoms."

<3-3. Determination of Simulation Parameters>

(1) Method Based on Posting Data of Information Transmission Service.

To obtain a useful simulation result, it is important to appropriately determine the simulation parameters. In this embodiment, the object image generation unit 250 determines the simulation parameters based on posting data collected from the external server. Posters actively post various activities or events in the real world in information transmission services. In many cases, the posting is performed in real time or with only a slight time lag. Accordingly, by determining the simulation parameters from the posting data of the information transmission services, a situation of a street changed over time can be tracked with only a slight time lag.

FIG. 19 is an explanatory diagram of a first method of determining the simulation parameters. Posting data PD1 to PDn collected by the data collection unit 290 within a given time frame are illustrated on the left in FIG. 19. The object image generation unit 250 estimates the number and an attribute of humans corresponding to each geographic region by analyzing the posting data PD1 to PDn and determines the scale and attribute of a crowd of each geographic region according to the estimation result. Here, the phrase "corresponding to the geographic region" can include a meaning that an activity relevant to each geographic region is performed (for example, "a new house in ABC district is searched for" or "ABC district is discussed"), in addition to the position of each geographic region. The object image generation unit 250 may determine behaviors of humans corresponding to each geographic region and an event taking place in each geographic region by analyzing the posting data PD1 to PDn.

FIG. 20A is an explanatory diagram of a first example of the analysis of the posting data. In the first example, the posting data PD1 includes user identification information PD1a, text PD1b, an image PD1c, and position data PD1d.

For example, the object image generation unit 250 may acquire an attribute of a poster (registered in an information transmission service) of the posting data PD1 using the user identification information PD1a (step S11a). Instead, the object image generation unit 250 may extract a keyword or a key phrase from the text PD1b by applying a natural language analysis technique of the related art to the text PD1b and determine the attribute of the poster of the posting data PD1 from the extracted keyword or the extracted key phrase (step S11b). For example, the poster can be determined to be a young person around 20 years old from the key phrase of "attending college" and the poster can be determined to be a male from the key phrase of "I want a girl friend." The attribute of the poster of the posting data PD1 may be determined based on text or an image included in past posting data PDx including the same user identification information PD1a as that of the posting data PD1 rather than the posting data PD1.

In the first example of FIG. 20A, the position data PD1d indicates a geographic position of the poster when the posting data PD1 is uploaded. Accordingly, the object image generation unit 250 can determine the geographic region corresponding to the posting data PD1 using the position data PD1d (step S12). Further, the object image generation unit 250 can estimate the scale of the crowd of each geographic region by aggregating the amount of posting data of each geographic region among the total posting data. The object image generation unit 250 can estimate the attribute of the crowd of each geographic region by aggregating the attribute determined from the posting data in each geographic region among the total posting data (step S13), FIG. 20B is an explanatory diagram of a second example of the analysis of the posting data. In the second example, the posting data PD2 includes text PD2b, an image PD2c, and position data PD2d. The user identification information is deleted from the posting data PD2 to protect privacy.

For example, the object image generation unit 250 can determine the attribute of a poster of the posting data PD2 based on a keyword or a key phrase extracted from the text PD2b (step S21a). The object image generation unit 250 can determine the attribute (sex, age, or the like) of the poster of the posting data PD2 or a subject shown in the image PD2c by applying an image recognition technique of the related art to the image PD2c (step S21b).

In the second example of FIG. 20B, the position data PD2d indicates a geographic position of the poster when the posting data PD2 is uploaded. Accordingly, the object image generation unit 250 can determine the geographic region corresponding to the posting data PD2 using the position data PD2d (step S22). The object image generation unit 250 can estimate the scale of the crowd of each geographic region by aggregating the amount of posting data of each geographic region among the total posting data. The object image generation unit 250 can estimate the attribute of the crowd of each geographic region by aggregating the attribute determined from the posting data in each geographic region among the total posting data (step S23).

FIG. 20C is an explanatory diagram illustrating a third example of the analysis of the posting data. In the third example, the posting data PD3 includes text PD3b and an image PD3c.

For example, the object image generation unit 250 can determine the attribute of a poster of the posting data PD3 based on a keyword or a key phrase extracted from the text PD3b (step S31a). The object image generation unit 250 can determine the attribute of the poster of the posting data PD3 or a subject shown in the image PD3c by applying an image recognition technology of the related art to the image PD3c (step S31b).

In the third example, the posting data PD3 include no position data. Thus, for example, the object image generation unit 250 can determine a geographic region corresponding to the posting data PD3 based on a keyword or a key phrase extracted from the text PD3b (step S32a). For example, the geographic region may be determined based on a place name shown in the keyword or a geographic region of the location of a facility may be determined based on the number of the facility shown in the keyword. Instead, the object image generation unit 250 may determine the geographic region corresponding to the posting data PD3 by matching the image PD3c with various existing images (step S32b).

The object image generation unit 250 can estimate the scale of the crowd of each geographic region by aggregating the amount of posting data of each geographic region among the total posting data. The object image generation unit 250 can estimate the attribute of the crowd of each geographic region by aggregating the attribute determined from the posting data of each geographic region among the total posting data (step S33).

The analysis of the posting data may be performed not only to estimate the scale and the attribute of the crowd of each geographic region but also to model the behavior of the crowd. FIG. 20D is an explanatory diagram of a fourth example of the analysis of the posting data. In the fourth example, the posting data PD4 includes text PD4b and position data PD4d.

For example, the object image generation unit 250 can determine the attribute of a poster of the posting data PD4 based on a keyword or a key phrase extracted from the text PD4b (step S41). The object image generation unit 250 can determine a geographic region corresponding to the posting data PD4 using the position data PD4d (step S42). The object image generation unit 250 can estimate the scale and the attribute of the crowd of each geographic region by aggregating the amount and the attribute of posting data of each geographic region among the total posting data (step S43).

In the fourth example, the object image generation unit 250 models a behavior of the crowd of each geographic region based on the determined attribute of the poster of the posting data PD4 (or the aggregated attribute of the crowd) using the text PD4b (step S44), For example, when the poster of the posting data PD4 is determined to be a business man based on the text PD4b, one of the character models included in the crowd of the geographic region corresponding to the posting data PD4 can perform the behavior "calling" exemplified in FIG. 17. When the attribute of the crowd of a certain geographic region indicates that young people are abundant, several of the character models included in the crowd can perform the behavior, "jogging" exemplified in FIG. 17. To model a behavior of the crowd, an image or user identification information may be used instead of the text included in the posting data.

The analysis of the posting data may be performed to determine an event taking place in a target region or an event estimated to take place. FIG. 20E is an explanatory diagram of a fifth example of the analysis of the posting data. In the fifth example, the posting data PD5 includes a text PD5b and an image PD5c.

For example, the object image generation unit 250 can determine the attribute of a poster of the posting data PD5 based on a keyword or a key phrase extracted from the text PD5b (step S51a). The object image generation unit 250 can determine the attribute of the poster of the posting data PD5 or a subject shown in the image PD5c by applying an image recognition technique of the related art to the image. PD3c (step S51b). The object image generation unit 250 can determine a geographic region corresponding to the posting data PD5 based on the keyword or the key phrase extracted from the text PD5b (step S52). The object image generation unit 250 can estimate the scale and the attribute of the crowd of each geographic region by aggregating the amount and the attribute of posting data of each geographic region among the total posting data (step S53).

In the fifth example, the object image generation unit 250 can determine that an event takes place in the geographic region corresponding to the posting data PD5 based on the keyword or the key phrase extracted from the text PD5b (step Ss54a). For example, the object image generation unit 250 may determine that an event "traffic accident" occurs from the key phrase of "witnessed a traffic accident." The object image generation unit 250 may determine that an event takes place in the geographic region corresponding to the posting data PD5 based on the image PD5c (step S54b). For example, when cherry blossoms are shown in the image PD5c, the object image generation unit 250 may determine, that an event "blooming of cherry blossoms" takes place.

The various methods described in this section to determine the simulation parameters may be mutually combined.

(2) Method Based on Statistical Data

In this embodiment, the object image generation unit 250 can determine the simulation parameters further based on statistical data collected from the external server. The statistical data used here is data aggregated with reference to a geographic position with regard to one or more humans.

FIG. 21A is an explanatory diagram of a second method of determining the simulation parameters. Referring to FIG. 21A, statistical data SD collected from the external server is illustrated in addition to the posting data PD1 to PDn illustrated in FIG. 19. For example, the statistical data SD may be traffic data indicating traffic congestion information. In this case, the object image generation unit 250 can determine the number (scale) of vehicle models of each geographic region according to a level of the traffic congestion indicated by the traffic data. The statistical data SD may be average annual income data indicating an average annual income according to a region. In this case, the object image generation unit 250 can use a value of an income indicated by the average income data as a value of an income (attribute) of the crowd of each geographic region. The statistical data SD may be public security data indicating a crime rate according to a region. In this case, the object image generation unit 250 may cause a character model to perform a specific behavior (for example, the behavior, "smoking," exemplified in FIG. 17), for example, in a geographic region in which the value of the crime rate indicated by the public security data is high or cause a specific event (for example, travelling of a patrol car) to take place.

(3) Use of Weather Data

In this embodiment, the object image generation unit 250 may change a background of a crowd image based on weather data collected from the external server. The weather data used here is data indicating weather at a designated time a simulation time or another time) of a target region.

FIG. 21B is an explanatory diagram of a third method of determining the simulation parameters. Referring to FIG. 21B, weather data WD collected from the external server is illustrated in addition to the posting data PD1 to PDn illustrated in FIG. 19. The object image generation unit 250 outputs weather of a target region indicated by the weather data WD as a simulation parameter to the simulation unit 280 and changes the weather expressed by the background of the crowd image. The object image generation unit 250 may also output a designated time (or a period of time (for example, morning, afternoon, early evening, or evening)) as a simulation parameter to the simulation unit 280 and change the period of time expressed by the background of the crowd image.

<3-4. Example of Object Image>

FIG. 22 is an explanatory diagram of an example of a distorted image which can be displayed in the second embodiment.

Referring to FIG. 22, a navigation window W41 displaying an input image in the normal display mode is illustrated. A road R1 and buildings standing side by side along the road R1, and a person walking an the road R1 are shown in the input image. For example, when the user taps the navigation window W41, the display mode transitions to the distortion display mode, a distortion criterion set to straighten a road is selected, and a navigation window W42 is displayed. The navigation window W42 displays a distorted image on which an object image Im43 is superimposed. The object image Im43 includes not only an image of a building J13 hidden in the input image but also a crowd image Im44 expressing a crowd simulated by the simulation unit 280. In the example of FIG. 22, the crowd image Im44 includes two characters and one automobile.

<3-5. Summarization of Second Embodiment>

The second embodiment of the technology according to the present disclosure has been described in detail above with reference to FIGS. 13 to 22. According to this embodiment, not only static objects defined in advance but also dynamic objects such as a person and a vehicle are displayed in an object image used to supplement a blank portion of a distorted image. The number, the attribute, and the behaviors of the dynamic objects are determined based on the position-associated data such as posting data in an information transmission service of a user transmission type. Accordingly, a situation of the real world which can change over time can be reproduced in the object image, and thus a natural distorted image can be presented to the user. For example, in a distorted image of a tourist spot in which people gather mostly on holidays, an object image supplemented on a holiday can show a street crowded with people and an object image supplemented on an ordinary day can show a quiet street.

The posting data of the information transmission service of the user transmission type used in this embodiment is posted in real time or with only a slight time lag with regard to a real activity or event in many cases. Accordingly, by using the adaptability of such information transmission services of the user transmission type, a situation of a street which can change over time can be tracked with a small time lag.

The distorted images displayed in the first and second embodiments show a distorted or simulated form of an object (a building, a road, a person, a vehicle, or the like) which can actually be present in the real world. Such a method is also useful in that an information overload situation (a situation in which an image is buried due to excessive annotation) on a screen liable to occur in a general augmented reality (AR) application is not caused.

A series of processes performed by each device described in the specification is realized generally using software. Programs of the software realizing the series of processes are stored in advance, for example, in storage media (non-transitory media) installed inside or outside each device. For example, each program is read to a RAM and is executed by a processor such as a CPU at the time of execution.

The preferred embodiments of the present disclosure have been described in detail above with reference to the appended drawings, but the technical scope of the present disclosure is not limited to the examples. It should be apparent to skilled in the art of a technical field of the present disclosure that various modifications or corrections can be made within the scope of the technical spirit disclosed in the claims and are, of course, understood to pertain to the technical scope of the present disclosure.

Additionally, the present technology may also be configured as below.

(1) An information processing system including:
circuitry configured to
acquire image data;
distort the acquired image data according to a predetermined distortion criterion;
acquire an object image corresponding to an object that is at least partially obstructed in the acquired image;
combine the object image with the distorted image data; and
output the distorted image data combined with the object image.

(2) The information processing system of (1), wherein the acquired image data corresponds to a real world image captured by an image capture device.

(3) The information processing system of (2), wherein the acquired image data is a still image or a series of still images forming a moving image.

(4) The information processing system of any of (1) to (3), wherein the circuitry is configured to store a model indicating a position of the object present in the real world.

(5) The information processing system of (4), wherein
the acquired image data corresponds to a real world image captured by an image capture device, and
the circuitry is configured to
detect characteristic points from the acquired image data;
determine a position and posture of the information processing system based on data output from a sensor unit; and
extract characteristic point data regarding the object from the model.

(6) The information processing system of (5) wherein the circuitry is configured to: match the characteristic points detected from the acquired image data with the characteristic points extracted from the model; and
modify positions of the matched characteristic points based on the predetermined distortion criterion.

(7) The information processing system of any of (1) to (6), wherein the circuitry is configured to distort the acquired image data by changing a curvature in a road included in the acquired image data as the predetermined distortion criterion.

(8) The information processing system of any of (1) to (7), wherein the circuitry is configured to distort the acquired image data by changing a gradient of a road in the acquired image data as the predetermined distortion criterion.

(9) The information processing system of any of (1) to (8), wherein the circuitry is configured to distort the acquired image data by omitting a building shown in the acquired image data as the predetermined distortion criterion.

(10) The information processing system of any of (1) to (9), wherein the circuitry is configured to distort the acquired image data by widening a width of a road included in the acquired image data as the predetermined distortion criterion.

(11) The information processing system of any of (1) to (10), wherein the circuitry is configured to distort the acquired image data by enlarging a building behind another building included in the acquired image data as the predetermined distortion criterion.

(12) The information processing system of any of (1) to (11), wherein the distorted image data includes a blank portion as a result of the distortion.

(13) The information processing system of (12), wherein the circuitry is configured to generate the object image based on the blank portion included in the distorted image data.

(14) The information processing system of any of (1) to (13), wherein the circuitry is configured to combine the object image with the distorted image data by overlaying the object image on the distorted image data.

(15) The information processing system of (14), wherein the distorted image data is real image data and the object image is an icon.

(16) The information processing system of any of (1) to (15), further including:
a display; and
a user interface, wherein the circuitry is configured to control the display to switch between displaying the acquired image data and the distorted image data based on an input received at the user interface.

(17) The information processing system of any of (1) to (16), wherein, the information processing system is a personal navigation system, and the circuitry is configured to overlay navigation directions on the distorted image data combined with the object image.

(18) The information processing system of any of (1) to (17), wherein the information processing system is a wearable device having a shape of head-mounted glasses.

(19) A method performed by an information processing system, the method including: acquiring an image;

distorting, by circuitry of the information processing system, the acquired image according to a predetermined distortion criterion;

acquiring an object image corresponding to an object that is at least partially obstructed in the acquired image data;

combining, by the circuitry, the object image with the distorted image; and outputting the distorted image combined with the object image.

(20) A non-transitory computer-readable medium including computer program instructions, which when executed by an information processing system, cause the information processing system to:

acquire an image;

distort the acquired image according to a predetermined distortion criterion;

acquire an object image corresponding to an object that is at least partially obstructed in the acquired image data;

combine the object image with the distorted image; and output the distorted image combined with the object image.

Additionally, the present technology may also be configured as below.

(1)

An image processing device including:

an image acquisition unit that acquires an input image in which a real world is shown;

an image processing unit that generates a distorted image by distorting the input image according to a certain criterion; and a generation unit that generates an object image corresponding to an object to be located in a blank portion using a model expressing a position of an object present in the real world when the blank portion is produced in the distorted image as a result of the distortion, wherein the image processing unit overlays the object image generated by the generation unit onto the blank portion of the distorted image, (2)

The image processing device according to (1), wherein the object image is an image to occupy the blank portion when the real word is distorted according to the criterion.

(3)

The image processing device according to (1), wherein the object image is an icon image corresponding to the object to be located in the blank portion.

(4)

The image processing device according to any one of (1) to (3), wherein the image processing unit distorts the input image so that curvature of a road shown in the input image is changed, and wherein the blank portion is a portion which is not shown in the input image due to the curvature of the road.

(5)

The image processing device according to any one of (1) to (3), wherein the image processing unit distorts the input image so that a gradient of a road shown in the input image is changed, and wherein the blank portion is a portion which is not shown in the input image due to the gradient of the road.

(6)

The image processing device according to (4) or (5), wherein the image processing unit generates the distorted image by matching a characteristic point detected in the input image with a characteristic point defined by the model and moving a position of the matched characteristic point according to the criterion.

(7)

The image processing device according to any one of (4) to (6), wherein the image processing unit selects, as a target of the distortion, the road designated by a user through a screen on which the input image is displayed, (8)

The image processing device according to any one of (4) to (6), further including:

a navigation unit that provides a user with navigation up to a destination location designated by the user, wherein the image processing unit selects the road on a route up to the destination location set by the navigation unit as a target of the distortion.

(9)

The image processing device according to any one of (1) to (8), further including:

a user interface unit that provides a user with a user interface on which the user switches between a first display mode in which the input image is displayed on a screen and a second display mode in which the distorted image in which the object image is overlaid is displayed on the screen.

(10)

The image processing device according to (9), wherein the user interface unit further provides the user with a user interface on which the user designates the criterion.

(11)

The image processing device according to (9), wherein the image processing device is a head-mounted device that includes a visual line detection module detecting a visual line of the user, and wherein the user interface unit switches between the first display mode and the second display mode based on a visual line detection result obtained from the visual line detection module.

(12)

The image processing device according to any one of (1) to (3), wherein the image processing unit overlays the object image onto the distorted image so that an object hidden by another object in the input image is shown in the distorted image.

(13)

The image processing device according to any one of (1) to (12), further including:

a data collection unit that collects position-associated data associated with a plurality of human geographic positions; and a simulation unit that performs simulation on a crowd present in the real world based on the collected position-associated data, wherein the generation unit superimposes an image of the crowd simulated by the simulation unit with regard to a region of the real world corresponding to the blank portion, onto the object image.

(14)

The image processing device according to (13), wherein at least one of a scale, an attribute, and a behavior of the crowd is determined based on the position-associated data and is reproduced in the simulation.

(15)

An image processing method performed by an image processing device, the method including:

acquiring an input image in which a real world is shown; generating a distorted image by distorting the input image according to a certain criterion; and generating an object image corresponding to an object to be located in a blank portion using a model expressing a position of an object present in the real world when the blank portion is produced in the distorted image as a result of the distortion, wherein the generated object image is overlaid onto the blank portion of the distorted image.

(16)

A program causing a computer controlling an image processing device to function as:

an image acquisition unit that acquires an input image in which a real world is shown;

an image processing unit that generates a distorted image by distorting the input image according to a certain criterion; and a generation unit that generates an object image corresponding to an object to be located in a blank portion using a model expressing a position of an object present in the real world when the blank portion is produced in the distorted image as a result of the distortion, wherein the image processing unit overlays the object image generated by the generation unit onto the blank portion of the distorted image.

(17)

A terminal device including:

an image acquisition unit that acquires an input image in which a real world is shown; and a control unit that transmits the input image to a server device which overlays, onto a blank portion of a distorted image generated by distorting the input image according to a certain criterion, an object image corresponding to an object to be located in the blank portion and generated using a model expressing a position of an object present in the real world, and that displays the distorted image received from the server device on a screen.

(18)

The terminal device according to (17), further including:

a user interface unit that provides a user interface on which a user switches between a first display mode in which the input image is displayed on a screen and a second display mode in which the distorted image in which the object image is overlaid is displayed on the screen.

(19)

An image processing method performed by a terminal device, the method including: acquiring an input image in which a real world is shown;

transmitting the input image to a server device which overlays, onto a blank portion of a distorted image generated by distorting the input image according to a certain criterion, an object image corresponding to an object to be located in the blank portion and generated using a model expressing a position of an object present in the real world;

receiving the distorted image from the server device; and displaying the received distorted image on a screen.

(20)

A program causing a computer controlling a terminal device to function as:

an image acquisition unit that acquires an input image in which a real world is shown; and a control unit that transmits the input image to a server device which overlays, onto a blank portion of a distorted image generated by distorting the input image according to a certain criterion, an object image corresponding to an object to be located in the blank portion and generated using a model expressing a position of an object present in the real world, and that displays the distorted image received from the server device on a screen.

REFERENCE SIGNS LIST 100, 200 image processing device
120 image acquisition unit
140 image processing unit
150, 250 object image generation unit
160 user interface unit
170 navigation unit
280 simulation unit
290 data collection unit

The invention claimed is:

1. An information processing system comprising:
circuitry configured to
acquire image data,
distort the acquired image data by decreasing a curvature of a road or straightening the curvature of the road according to a predetermined distortion criterion including producing a blank portion in the acquired image at one or more positions of the curvature of the road as a result of the distortion,
acquire an object image corresponding to an object that is at least partially obstructed in the acquired image due to the curvature of the road,
combine the acquired object image with the distorted image data in order to generate the acquired object image at a location of the blank portion included in the distorted image data, and
output the distorted image data combined with the acquired object image in order to decrease the curvature of the road or straighten the curvature of the road.

2. The information processing system of claim 1, wherein the acquired image data corresponds to a real world image captured by an image capture device.

3. The information processing system of claim 2, wherein the acquired image data comprises a still image or a series of still images forming a moving image.

4. The information processing system of claim 1, wherein the circuitry is further configured to store a model indicating a position of the object present in the real world.

5. The information processing system of claim 4, wherein
the acquired image data corresponds to a real world image captured by an image capture device, and
the circuitry is further configured to
detect characteristic points from the acquired image data,
determine a position and posture of the information processing system based on data output from a sensor unit, and
extract characteristic point data regarding the object from the model.

6. The information processing system of claim 5 wherein the circuitry is further configured to
match the characteristic points detected from the acquired image data with the characteristic points extracted from the model, and
modify positions of the matched characteristic points based on the predetermined distortion criterion.

7. The information processing system of claim 1, wherein the circuitry is further configured to distort the acquired image data by changing a gradient of the road in the acquired image data.

8. The information processing system of claim 1, wherein the circuitry is further configured to distort the acquired image data by omitting a building shown in the acquired image data as the predetermined distortion criterion.

9. The information processing system of claim 1, wherein the circuitry is further configured to distort the acquired image data by widening a width of the road included in the acquired image data.

10. The information processing system of claim 1, wherein the circuitry is further configured to distort the acquired image data by enlarging a building behind another building included in the acquired image data as the predetermined distortion criterion.

11. The information processing system of claim 1, wherein the circuitry is further configured to combine the object image with the distorted image data by overlaying the object image on the distorted image data.

12. The information processing system of claim 11, wherein the distorted image data comprises real image data and the acquired object image comprises an icon.

13. The information processing system of claim 1, further comprising:
a display; and
a user interface, wherein
the circuitry is further configured to control the display to switch between displaying the acquired image data and the distorted image data based on an input received at the user interface.

14. The information processing system of claim 1, wherein,
the information processing system comprises a personal navigation system, and
the circuitry is further configured to overlay navigation directions on the distorted image data combined with the object image.

15. The information processing system of claim 1, wherein the information processing system further comprises a wearable device having a shape of head-mounted glasses.

16. A method performed by an information processing system, the method comprising:
acquiring an image;
distorting, by circuitry of the information processing system, the acquired image by decreasing a curvature of a road or straightening the curvature of the road according to a predetermined distortion criterion including producing a blank portion in the acquired image at one or more positions of the curvature of the road as a result of the distortion;
acquiring an object image corresponding to an object that is at least partially obstructed in the acquired image data due to the curvature of the road;
combining, by the circuitry, the acquired object image with the distorted image in order to generate the acquired object image at a location of the blank portion included in the distorted image data; and
outputting the distorted image combined with the acquired object image in order to decrease the curvature of the road or straighten the curvature of the road.

17. A non-transitory computer-readable medium including computer program instructions, which when executed by an information processing system, cause the information processing system to:
acquire an image;
distort the acquired image by decreasing a curvature of a road or straightening the curvature of the road according to a predetermined distortion criterion including producing a blank portion in the acquired image at one or more positions of the curvature of the road as a result of the distortion;
acquire an object image corresponding to an object that is at least partially obstructed in the acquired image data due to the curvature of the road;
combine the acquired object image with the distorted image in order to generate the acquired object image at a location of the blank portion included in the distorted image data; and
output the distorted image combined with the acquired object image in order to decrease the curvature of the road or straighten the curvature of the road.

* * * * *